(12) United States Patent
Takano

(10) Patent No.: US 9,438,392 B2
(45) Date of Patent: Sep. 6, 2016

(54) RADIO COMMUNICATION DEVICE, RADIO COMMUNICATION METHOD, AND RADIO COMMUNICATION SYSTEM

(71) Applicant: SONY CORPORATION, Minato-ku (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 22 days.

(21) Appl. No.: 14/364,957

(22) PCT Filed: Nov. 9, 2012

(86) PCT No.: PCT/JP2012/079192
§ 371 (c)(1),
(2) Date: Jun. 12, 2014

(87) PCT Pub. No.: WO2013/111422
PCT Pub. Date: Aug. 1, 2013

(65) Prior Publication Data
US 2014/0328307 A1 Nov. 6, 2014

(30) Foreign Application Priority Data
Jan. 26, 2012 (JP) ................................ 2012-013747

(51) Int. Cl.
*H04W 80/04* (2009.01)
*H04W 88/06* (2009.01)
(Continued)

(52) U.S. Cl.
CPC .............. *H04L 5/0035* (2013.01); *H04L 5/001* (2013.01); *H04W 24/02* (2013.01); *H04W 48/18* (2013.01); *H04B 7/024* (2013.01); *H04L 5/005* (2013.01); *H04L 5/0057* (2013.01); *H04L 5/0078* (2013.01); *H04W 16/32* (2013.01)

(58) Field of Classification Search
CPC ... H04W 80/04; H04W 88/06; H04W 28/04; H04W 72/04
USPC .................................................. 370/328, 329
See application file for complete search history.

(56) References Cited

U.S. PATENT DOCUMENTS

| | | | |
|---|---|---|---|
| 2004/0025182 A1* | 2/2004 | Tari et al. ........................ | 725/61 |
| 2010/0034108 A1* | 2/2010 | Ode .............................. | 370/252 |
| 2012/0135766 A1* | 5/2012 | Garavaglia ............ | H04B 7/024 |
| | | | 455/509 |

FOREIGN PATENT DOCUMENTS

| | | |
|---|---|---|
| JP | 2010-258612 A | 11/2010 |
| JP | 2011-061728 A | 3/2011 |
| JP | 2011-193441 A | 9/2011 |

OTHER PUBLICATIONS

International Search Report issued Dec. 18, 2012 in PCT/JP2012/079192.

(Continued)

*Primary Examiner* — Ronald B Abelson
(74) *Attorney, Agent, or Firm* — Chip Law Group

(57) ABSTRACT

In a radio communication, a UE terminal uses a CSI-RS as a reference signal for point selection only in the case of a scenario 4, and uses a CRS as a reference signal for point selection in the cases of scenarios 1 to 3 other than the scenario 4. Through RRC signaling, an eNodeB notifies the UE terminal of the fact that the measurement of a specific cell ID will be performed using a CSI-RS, that is, a cell ID using a CSI-RS as a reference signal for point selection. The operations suppress overhead of reference signals and improve a point selection update frequency.

16 Claims, 21 Drawing Sheets

(51) Int. Cl.
*H04W 28/04* (2009.01)
*H04W 72/04* (2009.01)
*H04L 5/00* (2006.01)
*H04W 48/18* (2009.01)
*H04W 24/02* (2009.01)
*H04B 7/02* (2006.01)
*H04W 16/32* (2009.01)

(56) References Cited

OTHER PUBLICATIONS

"Discussions on TP associations for CoMP", Samsung, 3GPP TSG-RAN WG1 #66bis meeting, R1-113092, Oct. 14, 2011, pp. 1-3.

"Channel and interference measurements", Huawei, HiSilicon, 3GPP TSG RAN WG1 meeting #66bis, R1-112901, Oct. 14, 2011, 4 Pages.

"Point selection and CSI feedback for CoMP operation", MediaTek Inc., 3GPP TSG-RAN WG1 #66bis, R1-113051, Oct. 14, 2011, 4 Pages.

"CSI-RS configurations for CoMP", ZTE, 3GPP TSG RAN WG1 #67, R1-113762, Nov. 18, 2011, pp. 1-3.

"Technical Specification Group Radio Access Network", 3rd Generation Partnership Project; Coordinated multi-point operation for LYE physical layer aspects (Release 11); 3GPP TR 36.819, vol. 11.1.0, Dec. 2011, Valbonne, France.

"Point Selection and CSI Feedback for CoMP Operation", MediaTek Inc., 3GPP TSG-RAN WG1 366bis R1-113051, Oct. 10-14, 2011, pp. 4, Zhuhai, China.

"Further Discussions of Standardization Impacts on CoMP", MediaTek 3GPP TSG-RAN WG1 #66 R1-112343, Aug. 22-26, 2011, pp. 3, Athens, Greece.

"Potential gain of DL CoMP with joint transmission", NEC Group 3GPP TSG RAN WG1 Meeting #57 R1-091688, May 4-8, 2009, pp. 4, San Francisco, USA.

"Views on Rel-11 CoMP", ZTE 3GPP TSG RAN WG1 Meeting #63bis R1-110172, Jan. 17-21, 2011, pp. 4, Dublin, Ireland.

"CSI-RS configurations for CoMP", ZTE 3 GPP TSG RAN WG1 Meeting #67 R1-113762, Nov. 14-18, 2011, pp. 3, San Francisco, USA.

Partial European Search Report issued on Aug. 4, 2015 in patent application No. 12866482.8.

Japanese Office Action issued on Sep. 8, 2015 in patent application No. 2013555130.

Office Action Received for Japanese Patent Application No. 2013-555130 Mailed on Dec. 15, 2015.

"RRM Measurement Set Management for Rel-11 CoMP" NTT Docomo, 3GPP TSG RAN WG1 Meeting #67, R1-114075, Nov. 14-18, 2011, 4 pages, San Francisco, USA.

"Downlink Control Signalling for CoMP" Samsung, 3GPP TSG RAN WG1 #67, R1-114229, Nov. 14-18, 2011, 5 pages, San Francisco, USA.

3GPP, "3rd Generation Partnership Project; Technical Specification Group Radio Access Network; Coordinated Multi-Point Operation for LTE Physical Layer Aspects (Release 11)", 3GPP Draft; DRAFT36819-B10, 3rd Generation Partnership Project (3GPP), December 20, 2011, pp. 69, Mobile Competence Centre ; 650, Route Des Lucioles ; F-06921 Sophia-Antipolis Cedex, France.

3GPP, "Finalizing Signaling and Configuration of CSI-RS", 3GPP Draft; Draft36819-B10, 3rd Generation Partnership Project (3GPP), October 11-15, 2010, pp. 7, vol. RAN WG1 #62bis, Xian, China.

NEC Group, "Potential Gain of DL CoMP With Joint Transmission", 3GPP Draft; R1-091688, 3rd Generation Partnership Project (3GPP), May 4-8, 2009, pp. 5, vol. RAN WG1 Meeting # 57, San Francisco, USA.

Intel Corporation, "Uplink Power Control Discussion for Comp Scenario 4", 3GPP Draft; R1-112228, 3rd Generation Partnership Project (3GPP), Aug. 22-26, 2011, pp. 16, vol. RAN WG1 #66, Athens, Greece.

Pantech, "Uplink Power Control Enhancement for CoMP", 3GPP Draft; R1-113835, 3rd Generation Partnership Project (3GPP), November 14-18, 2011 pp. 3, vol. RAN1 #67, San Francisco, USA.

Ericsson, St-Ericsson, "Aspects on Distributed RRUs With Shared Cell-ID for Heterogeneous Deployments", 3GPP Draft; R1-110649, 3rd Generation Partnership Project (3GPP), Feb. 21-25, 2011, pp. 11, vol. RAN WG1 #64, Taipei, Taiwan.

Texas Instruments, "On Reference Signals Configuration of DL CoMP", 3GPP Draft; R1-113251, 3rd Generation Partnership Project (3GPP), Oct. 10-14, 2011, pp. 3, vol. RAN WG1 #66bis, Zhuhai, P.R. China.

Hitachi Ltd, "Further Considerations on Scenario3", 3GPP Draft; R1-112586, 3rd Generation Partnership Project (3GPP), Aug. 22-26, 2011, pp. 6, vol. RAN WG1 #66, Athens, Greece.

Nokia, Nokia Siemens Networks, "Remaining Aspects of CSI-RS Design", 3GPP Draft; R1-106201, 3rd Generation Partnership Project (3GPP), Nov. 15-19, 2010, pp. 3, vol. RAN WG1 #63, Jacksonville, USA.

Huawei, Hisilicon, "Remaining Details on CSI RS", 3GPP Draft; R1-105840, 3rd Generation Partnership Project (3GPP), Nov. 15-19, 2010, pp. 12, vol. RAN WG1 #63, Jacksonville, USA.

Catt, "On Downlink Control Signaling of CoMP", 3GPP Draft; R1-113734, 3rd Generation Partnership Project (3GPP), Nov. 14-18, 2011, pp. 2, vol. RAN WG1 #67, San Francisco, USA.

"Supplementary European Search Report", Received for European Patent Application No. 12866482.8, Mailed on October 12, 2015, pp. 25.

* cited by examiner

RADIO COMMUNICATION DEVICE, RADIO COMMUNICATION METHOD, AND RADIO COMMUNICATION SYSTEM

TECHNICAL FIELD

The technology disclosed in the present specification relates to a radio communication device, a radio communication method, and a radio communication system adapted to simultaneously transmit and receive data to a terminal in cooperation with another base station, and particularly, to a radio communication device, a radio communication method, and a radio communication system adapted to determine a combination of base stations with respect to a terminal based on feedback from the terminal receiving a reference signal.

BACKGROUND ART

Currently, standardization of fourth-generation mobile communication systems is performed in third generation partnership project (3GPP). "Long term evolution (LTE)", that is one of data communication specifications designed by 3GPP, is a long term advanced system aiming for the fourth generation (4G) IMT-Advanced, and is called "3.9G (super 3G)."

In LTE, two duplex systems, i.e., frequency division duplex (FDD) and time division duplex (TDD) can be selected. In the FDD, an uplink-dedicated band and a downlink-dedicated band are used. In the uplink and the downlink, a format of a radio frame composed of ten consecutive sub-frames is used. Here, the uplink refers to communication from a terminal station (UE terminal: user equipment) to a base station (eNodeB: evolved Node B) of LTE, and the downlink refers to communication from an eNodeB to a UE terminal. In the TDD, a format of a radio frame composed of 10 consecutive sub-frames is also used. However, in the TDD, communication is performed using the same band in the uplink and in the downlink. Each sub-frame of the radio frame is composed of a control signal phy downlink control channel (PDCCH) from an eNodeB and a phy downlink shared channel (PDSCH) that is used as user data.

Coordinated multi point transmission and reception (CoMP) is considered as a key technology for improving the throughput of UE terminals positioned at cell edges in the standardization of Release 11 related to LTE of 3GPP. The CoMP is a technology for increasing desired signal power and for reducing interference from another cell by simultaneous data transmission and reception of plural eNodeBs with respect to one UE terminal. In order to efficiently derive macro diversity gain by CoMP, precoding, a reference signal, a measurement and feedback method, and the like should be examined. In LTE, a method of hierarchizing various sizes of cells such as macro, micro, pico and femto cells, called HetNet, is examined in Release 8, and the CoMP also includes communication to femto cells. The CoMP includes uplink CoMP and downlink CoMP, and the uplink CoMP is an important technology as the downlink CoMP. However, unless otherwise noted, description will be given regarding the downlink CoMP.

Examples of the method related to cells that realize the CoMP include a method in which plural eNodeBs respectively perform autonomous distributed control and a method in which one macro eNodeB performs integrated control on plural pico eNodeBs. In the latter integrated control method, plural base stations such as remote radio heads (RRHs) are arranged as a measure for non-sensing in cell edges and the like, and the connection with a macro eNodeB that performs integrated control of the base stations is achieved using an optical fiber with a baseband signal (to be described later). The macro eNodeB performs baseband signal processing and control of the respective RRHs to perform collective radio resource control between the cells.

Regarding the Determination of a CoMP Set

A combination of eNodeBs that perform CoMP with respect to one UE terminal, that is, that constitute a cooperation group will be called a set of CoMP transmission point(s) or a CoMP set for short.

In order to determine a CoMP set, it is necessary to judge which eNodeB is the most effective one to use for a UE terminal. This will be called CoMP set determination or point selection.

As one method for point selection, a method including receiving a reference signal from each base station by a UE terminal to measure reference signal received power (RSRP) for each base station, and selecting eNodeBs positioned at an upper level thereof as a CoMP set is exemplified.

For example, a cooperation group setting method in which a base station transmits, to a user terminal, cooperation group-setting signaling to which a cell ID of a cell in a cooperation group selected for the user terminal is attached, and the user terminal performs cooperation group setting by the cell ID of the cell in the cooperation group selected for the user terminal attached to the cooperation group-setting signaling is proposed (for example, see PTL 1).

In addition, a radio communication method in which a base station allocates a part of an entire frequency band to bands that are respectively used in single base station transmission (first transmission method) and in multiple base station transmission (second transmission method) to determine to use which transmission method based on feedback information indicating receiving quality received with respect to either of the transmission methods, that is, to reduce a feedback information quantity by limiting the feedback information to information indicating receiving quality of a part of the entire frequency band is proposed (for example, see PTL 2).

In addition, a radio communication system in which each of base station devices receives, from a target terminal device, quality information indicating communication quality between each base station device and a base station device communicable with the target terminal device, and acquires schedule information indicating a schedule of communication with a terminal device existing in the cell of another base station device to select, based on the quality information and the schedule information, several base station devices that are allowed to function as a base station with respect to the target terminal device is proposed (for example, see PTL 3).

Needless to say, determination of an eNodeB required for a UE terminal when performing point selection should be considered, but it is also important not to use an excessive number of eNodeBs in CoMP. The reason for this is that when an excessive number of eNodeBs are included in a CoMP set, the throughput of the entire system is reduced and the radiation of unnecessary radio waves to the neighborhood is increased. For example, in a case in which sufficient transmission quality is obtained for a UE terminal when, as a CoMP set, an eNodeB#1 and an eNodeB#2 perform downlink transmission, when an eNodeB#3 is further added to the CoMP set, the eNodeB#3 radiates unnecessary radio waves to the neighborhood, and thus becomes an interference source. Accordingly, it is important to constitute the CoMP set with a minimum necessary number of eNodeBs satisfying necessary quality.

Request Related to Point Selection Frequency

It is necessary to perform the point selection every certain period of time (that is, it is necessary to update the CoMP set every certain period of time). That is, whether the CoMP set of the UE terminal is to be semi-statically or dynamically updated becomes a problem. When considering the movement of the UE terminal, it is desired to perform dynamic point selection to dynamically update the CoMP set.

Basic Points to be Considered in Dynamic Point Selection

When performing dynamic point selection, it is necessary to consider a reduction in throughput due to the occupancy of a communication sequence by reference signals in the system, in other words, a downlink overhead due to reference signals.

In addition, it is necessary to consider an increase in power consumption of the UE terminal due to the frequent measurement of the reference signals by the UE terminal.

It is also necessary to consider an increase in uplink overhead due to feedback of the reference signal measurement results from the UE terminal to the eNodeB.

CITATION LIST

Patent Literature

PTL 1: Japanese Unexamined Patent Application Publication No. 2011-193441
PTL 2: Japanese Unexamined Patent Application Publication No. 2011-61728
PTL 3: Japanese Unexamined Patent Application Publication No. 2010-258612

SUMMARY OF INVENTION

Technical Problem

An object of the technology disclosed in the present specification is to provide an excellent radio communication device, radio communication method, and radio communication system adapted to apply a CoMP technology to properly perform dynamic point selection based on feedback from a UE terminal receiving a reference signal.

Another object of the technology disclosed in the present specification is to provide an excellent radio communication device, radio communication method, and radio communication system capable of suppressing downlink and uplink overhead due to reference signals and of improving a point selection update frequency.

A further object of the technology disclosed in the present specification is to provide an excellent radio communication device, radio communication method, and radio communication system capable of suppressing power consumption of a UE terminal that performs reference signal measurement and of improving a point selection update frequency.

Solution to Problem

The present application is contrived by taking into consideration the above problems, and the technology described in claim 1 provides a radio communication device including a measurement control part that sets a reference signal kind to be measured to determine a cooperation group that performs multi-point cooperative transmission and reception for the device, and a reference signal measurement part that measures a reference signal, that is transmitted from each base station, of the kind set by the measurement control part to determine the cooperation group.

According to the technology described in claim 2 of the present application, in the radio communication device according to claim 1, the measurement control part sets a reference signal kind to be measured to determine the cooperation group in accordance with a scenario that is applied in a current cell.

According to the technology described in claim 3 of the present application, in the radio communication device according to claim 2, each base station transmits a first reference signal that can be allocated to a place differing between base stations having the same cell identifier and that has an adjustable transmission cycle, and a second reference signal that uses the same place in base stations having the same cell identifier, and the measurement control part sets the first reference signal for use in measurement for determining the cooperation group in a first scenario in which the same cell identifier is allocated to each base station subordinate to the same large base station, and sets the second reference signal for use in measurement for determining the cooperation group in a second scenario in which a unique cell identifier is allocated for each base station even subordinate to the same large base station.

According to the technology described in claim 4 of the present application, in the radio communication device according to claim 1, the measurement control part sets a reference signal kind to be measured to determine the cooperation group based on a notification from the base station.

According to the technology described in claim 5 of the present application, in the radio communication device according to claim 4, each base station transmits a first reference signal that can be allocated to a place differing between base stations having the same cell identifier and that has an adjustable transmission cycle, and a second reference signal that uses the same place in base stations having the same cell identifier, and the measurement control part sets the first reference signal for use in measurement for determining the cooperation group with regard to a base station having a specific cell identifier notified by the base station, and sets the second reference signal for use in measurement for determining the cooperation group with regard to a base station having another cell identifier.

The technology described in claim 6 of the present application provides a radio communication device including a reference signal transmission part that transmits a first reference signal that can be allocated to a place differing between base stations having the same cell identifier and that has an adjustable transmission cycle, and a second reference signal that uses the same place in base stations having the same cell identifier, and a notification part that notifies a terminal belonging to the device of a cell identifier for which measurement for determining a cooperation group is to be performed using the first reference signal in accordance with a scenario that is applied in a current cell.

According to the technology described in claim 7 of the present application, in the radio communication device according to claim 6, in a scenario in which the same cell identifier is allocated to each base station subordinate to the same large base station, the notification part notifies a terminal belonging to the device of a cell identifier for which measurement for determining a cooperation group is to be performed using the first reference signal.

The technology described in claim 8 of the present application provides a radio communication device including a subordinate base station information acquisition part that acquires information on base stations subordinate to the device, a transmission frequency control part that controls a frequency of transmitting a reference signal for determining a cooperation group that performs multi-point cooperative transmission and reception based on the information on base stations acquired by the subordinate base station information acquisition part, and a notification part that notifies each base station of the control information obtained by the transmission frequency control part.

According to the technology described in claim 9 of the present application, in the radio communication device according to claim 8, the subordinate base station information acquisition part acquires information related to the number of terminals requiring the multi-point cooperative transmission and reception from the base stations subordinate to the device, and the transmission frequency control part controls the frequency of transmitting a reference signal in accordance with the number of terminals requiring the multi-point cooperative transmission and reception.

According to the technology described in claim 10 of the present application, in the radio communication device according to claim 9, the transmission frequency control part lengthens a cycle of transmitting a reference signal when the number of terminals requiring the multi-point cooperative transmission and reception is small.

The technology described in claim 11 of the present application provides a radio communication device including a reference signal transmission part that transmits a first reference signal, a feedback information acquisition part that acquires feedback on results of measurement of the first reference signal from a terminal, a measurement part that measures a reference signal to measure a second reference signal transmitted from the terminal, and a point selection part that determines a cooperation group that performs multi-point cooperative transmission and reception for a terminal station based on results of the measurement of the measurement part.

According to the technology described in claim 12 of the present application, in the radio communication device according to claim 11, when TDD is applied, the point selection part determines a cooperation group that performs multi-point cooperative transmission and reception for a terminal station based on the feedback information acquired by the feedback information acquisition part and results of the measurement of the measurement part.

The technology described in claim 13 of the present application provides a radio communication device including a reference signal measurement part that measures a reference signal transmitted from each base station to determine a cooperation group that performs multi-point cooperative transmission and reception for the device, and a measurement frequency control part that controls a frequency of performing measurement in the reference signal measurement part based on a moving speed of the device.

According to the technology described in claim 14 of the present application, in the radio communication device according to claim 13, the measurement frequency control part allows measurement in the reference signal measurement part to be performed only when the moving speed of the device is high.

The technology described in claim 15 of the present application provides a radio communication device including a reference signal measurement part that measures a reference signal transmitted from each base station to determine a cooperation group that performs multi-point cooperative transmission and reception for the device, and a measurement frequency control part that controls a frequency of the measurement for each base station in the reference signal measurement part based on results of the measurement in the reference signal measurement part.

According to the technology described in claim 16 of the present application, in the radio communication device according to claim 15, based on the results of the measurement in the reference signal measurement part, the measurement frequency control part increases the measurement frequency for a base station in which a deterioration in communication quality is detected.

According to the technology described in claim 17 of the present application, in the radio communication device according to claim 15, the measurement frequency control part increases the measurement frequency for a new base station that is not included in the cooperation group when a base station exhibiting a deterioration in communication quality is detected in the cooperation group.

According to the technology described in claim 18 of the present application, in the radio communication device according to claim 8, the subordinate base station information acquisition part acquires arrangement information of the base stations subordinate to the device, and the transmission frequency control part controls the frequency of transmitting a reference signal in accordance with density of the base stations subordinate to the device.

According to the technology described in claim 19 of the present application, in the radio communication device according to claim 18, the transmission frequency control part increases the frequency of transmitting a reference signal in an area in which the density of the base stations subordinate to the device is high.

The technology described in claim 20 of the present application provides a radio communication device including a base station information acquisition part that acquires arrangement information of base stations that can be included in a cooperation group that performs multi-point cooperative transmission and reception for the device, a measurement frequency control part that controls a frequency of measuring a reference signal from a base station based on the acquired base station arrangement information, to determine the cooperation group, and a reference signal measurement part that measures a reference signal from a base station in accordance with the frequency controlled by the measurement frequency control part.

According to the technology described in claim 21 of the present application, in the radio communication device according to claim 20, the measurement frequency control part increases the frequency of measuring a reference signal in an area in which density of the base stations that can be included in the cooperation group is high.

The technology described in claim 22 of the present application provides a radio communication device including a carrier determination part that determines the importance of performing multi-point cooperative transmission and reception for each component carrier upon carrier aggregation, a transmission frequency control part that controls a frequency of transmitting a reference signal for determining a cooperation group that performs multi-point cooperative transmission and reception in each component carrier based on results of the determination in the carrier determination part, and a notification part that notifies each base station of the control information obtained by the transmission frequency control part.

According to the technology described in claim 23 of the present application, in the radio communication device according to claim 22, the transmission frequency control part increases the frequency of transmitting a reference signal in a component carrier of high importance of performing the multi-point cooperative transmission and reception.

The technology described in claim 24 of the present application provides a radio communication device including a transmission frequency control part that controls a frequency of transmitting a reference signal for determining a cooperation group that performs multi-point cooperative transmission and reception in each component carrier in accordance with frequency upon carrier aggregation, and a notification part that notifies each base station of the control information obtained by the transmission frequency control part.

According to the technology described in claim 25 of the present application, in the radio communication device according to claim 24, the transmission frequency control part increases the frequency of transmitting a reference signal in a component carrier of high frequency.

The technology described in claim 26 of the present application provides a radio communication device including a transmission frequency control part that controls a frequency of transmitting a reference signal for determining a cooperation group that performs multi-point cooperative transmission and reception in each component carrier in accordance with arrangement in terms of frequency upon carrier aggregation, and a notification part that notifies each base station of the control information obtained by the transmission frequency control part.

According to the technology described in claim 27 of the present application, in the radio communication device according to claim 26, the transmission frequency control part allows a reference signal to be transmitted to only one of component carriers consecutively arranged in terms of frequency.

According to the technology described in claim 28 of the present application, in the radio communication device according to claim 26, the transmission frequency control part allows a reference signal to be transmitted so that there is no overlap in terms of time and frequency in respective component carriers consecutively arranged in terms of frequency.

According to the technology described in claim 29 of the present application, in the radio communication device according to claim 8, the subordinate base station information acquisition part acquires information related to the number of terminals that are in a radio link control-connected state with the respective base stations subordinate to the device, and the transmission frequency control part controls the frequency of transmitting a reference signal by the respective base stations subordinate to the device in accordance with the number of terminals that are in a radio link control-connected state.

According to the technology described in claim 30 of the present application, in the radio communication device according to claim 29, the transmission frequency control part increases the frequency of transmitting a reference signal from a base station having a large number of terminals that are in a radio link control-connected state.

The technology described in claim 31 of the present application provides a radio communication method including a measurement control step of setting a reference signal kind to be measured to determine a cooperation group that performs multi-point cooperative transmission and reception for the device, and a reference signal measurement step of measuring a reference signal, that is transmitted from each base station, of the kind set in the measurement control step to determine the cooperation group.

The technology described in claim 32 of the present application provides a radio communication method including a reference signal transmission step of transmitting a first reference signal that can be allocated to a place differing between base stations having the same cell identifier and that has an adjustable transmission cycle, and a second reference signal that uses the same place in base stations having the same cell identifier, and a notification step of notifying a terminal belonging to the device of a cell identifier for which measurement for determining a cooperation group is to be performed using the first reference signal in accordance with a scenario that is applied in a current cell.

The technology described in claim 33 of the present application provides a radio communication method including a subordinate base station information acquisition step of acquiring information on base stations subordinate to the device, a transmission frequency control step of controlling a frequency of transmitting a reference signal for determining a cooperation group that performs multi-point cooperative transmission and reception based on the information on base stations acquired in the subordinate base station information acquisition step, and a notification step of notifying each base station of the control information obtained by the transmission frequency control step.

The technology described in claim 34 of the present application provides a radio communication method including a feedback information acquisition step of acquiring feedback on results of measurement of a first reference signal from a terminal, a measurement step of measuring a reference signal to measure a second reference signal transmitted from the terminal, and a point selection step of determining a cooperation group that performs multi-point cooperative transmission and reception for a terminal station based on the feedback information acquired in the feedback information acquisition step and results of the measurement in the measurement step.

The technology described in claim 35 of the present application provides a radio communication method including a measurement frequency control step of controlling a frequency of measuring a reference signal transmitted from each base station based on a moving speed of the device, and a reference signal measurement step of measuring a reference signal to determine a cooperation group that performs multi-point cooperative transmission and reception for the device in accordance with the frequency controlled in the measurement frequency control step.

The technology described in claim 36 of the present application provides a radio communication method including a reference signal measurement step of measuring a reference signal transmitted from each base station to determine a cooperation group that performs multi-point cooperative transmission and reception for the device, and a measurement frequency control step of controlling a frequency of the measurement for each base station in the reference signal measurement part based on results of the measurement in the reference signal measurement step.

The technology described in claim 37 of the present application provides a radio communication method including a base station information acquisition step of acquiring arrangement information of base stations that can be included in a cooperation group that performs multi-point cooperative transmission and reception for the device, a measurement frequency control step of controlling a frequency of measuring a reference signal from a base station based on the acquired base station arrangement information, to determine the cooperation group, and a reference signal measurement step of measuring a reference signal from a base station in accordance with the frequency controlled in the measurement frequency control step.

The technology described in claim 38 of the present application provides a radio communication method including a carrier determination step of determining the importance of performing multi-point cooperative transmission and reception for each component carrier upon carrier aggregation, a transmission frequency control step of controlling a frequency of transmitting a reference signal for determining a cooperation group that performs multi-point cooperative transmission and reception in each component carrier based on results of the determination in the carrier determination step, and a notification step of notifying each base station of the control information obtained by the transmission frequency control step.

The technology described in claim 39 of the present application provides a radio communication method including a transmission frequency control step of controlling a frequency of transmitting a reference signal for determining a cooperation group that performs multi-point cooperative transmission and reception in each component carrier in accordance with frequency upon carrier aggregation, and a notification step of notifying each base station of the control information obtained by the transmission frequency control step.

The technology described in claim 40 of the present application provides a radio communication method including a transmission frequency control step of controlling a frequency of transmitting a reference signal for determining a cooperation group that performs multi-point cooperative transmission and reception in each component carrier in accordance with arrangement in terms of frequency upon carrier aggregation, and a notification step of notifying each base station of the control information obtained by the transmission frequency control step.

The technology described in claim 41 of the present application provides a radio communication system including a plurality of base stations that transmit a plurality of kinds of reference signals, respectively, and a terminal station that performs reference signal measurement by setting a reference signal kind to be measured to determine a cooperation group that performs multi-point cooperative transmission and reception for the terminal station.

Herein, the "system" is a system in which plural devices (or functional modules realizing a specific function) are logically gathered, and it doesn't matter whether the devices or the functional modules are in a single casing (and the same hereinafter).

The technology described in claim 42 of the present application provides a radio communication system including a plurality of base stations that transmit a first reference signal that can be allocated to a place differing between base stations having the same cell identifier and that has an adjustable transmission cycle, and a second reference signal that uses the same place in base stations having the same cell identifier, and a terminal station that performs measurement for determining a cooperation group that performs multi-point cooperative transmission and reception for the terminal station by receiving a reference signal, in which at least one of the plurality of base stations notifies a terminal station belonging thereto of a cell identifier for which the measurement for determining the cooperation group is to be performed using the first reference signal.

The technology described in claim 43 of the present application provides a radio communication system including a plurality of base stations that transmit a reference signal, and a terminal station that performs measurement for determining a cooperation group that performs multi-point cooperative transmission and reception for the terminal station by receiving the reference signal from the base station, in which at least one of the plurality of base stations controls a frequency of transmitting a reference signal from each base station based on information acquired from a base station subordinate to the terminal station.

The technology described in claim 44 of the present application provides a radio communication system including a plurality of base stations that transmit a first reference signal, and a terminal station that performs measurement for determining a cooperation group that performs multi-point cooperative transmission and reception for the terminal station by receiving the first reference signal to give feedback to the base station and to transmit a second reference signal, in which at least one of the plurality of base stations determines the cooperation group that performs multi-point cooperative transmission and reception for the terminal station based on the feedback information from the terminal station and results of measurement of the second reference signal therein.

The technology described in claim 45 of the present application provides a radio communication system including a plurality of base stations that transmit a reference signal, and a terminal station that performs measurement for determining a cooperation group that performs multi-point cooperative transmission and reception for the terminal station by receiving the reference signal with a frequency according to a moving speed of the terminal station.

The technology described in claim 46 of the present application provides a radio communication system including a plurality of base stations that transmit a reference signal, and a terminal station that performs measurement for determining a cooperation group that performs multi-point cooperative transmission and reception for the terminal station by receiving the reference signal from the base station, in which the terminal station controls a measurement frequency for each base station based on results of the measurement of the reference signal from each base station.

The technology described in claim 47 of the present application provides a radio communication system including a plurality of base stations that transmit a reference signal, and a terminal station that performs measurement for determining a cooperation group that performs multi-point cooperative transmission and reception for the terminal station by receiving the reference signal from the base station, in which the terminal station controls a frequency of measuring the reference signal from the base station based on arrangement information of the base stations which can be included in the cooperation group.

The technology described in claim 48 of the present application provides a radio communication system including a plurality of base stations that transmit a reference signal, and a terminal station that performs measurement for determining a cooperation group that performs multi-point cooperative transmission and reception for the terminal station by receiving the reference signal from the base station, in which at least one of the plurality of base stations controls a frequency of transmitting a reference signal for each component carrier based on the importance of performing multi-point cooperative transmission and reception in each component carrier upon carrier aggregation.

The technology described in claim 49 of the present application provides a radio communication system including a plurality of base stations that transmit a reference signal, and a terminal station that performs measurement for determining a cooperation group that performs multi-point cooperative transmission and reception for the terminal station by receiving the reference signal from the base station, in which at least one of the plurality of base stations controls a frequency of transmitting a reference signal for each component carrier in accordance with frequency of each component carrier upon carrier aggregation.

The technology described in claim 50 of the present application provides a radio communication system including a plurality of base stations that transmit a reference signal, and a terminal station that performs measurement for determining a cooperation group that performs multi-point cooperative transmission and reception for the terminal station by receiving the reference signal from the base station, in which at least one of the plurality of base stations controls a frequency of transmitting a reference signal in each of component carriers consecutively arranged in terms of frequency in accordance with the arrangement of the component carriers in terms of frequency upon carrier aggregation.

Advantageous Effects of Invention

According to the technology disclosed in the present specification, it is possible to provide an excellent radio communication device, radio communication method, and radio communication system capable of suppressing downlink and uplink overhead due to reference signals for point selection and of improving a point selection update frequency.

In addition, according to the technology disclosed in the present specification, it is possible to provide an excellent radio communication device, radio communication method, and radio communication system capable of suppressing power consumption of a UE terminal that performs reference signal measurement and of improving a point selection update frequency.

Other objects, characteristics, and advantages of the technology disclosed in the present specification will become apparent from the more detailed description based on exemplary embodiments to be described later and the accompanying drawings.

DESCRIPTION OF EMBODIMENTS

Exemplary embodiments of the technology disclosed in the present specification will be described in detail with reference to the drawings.

Figure 21:
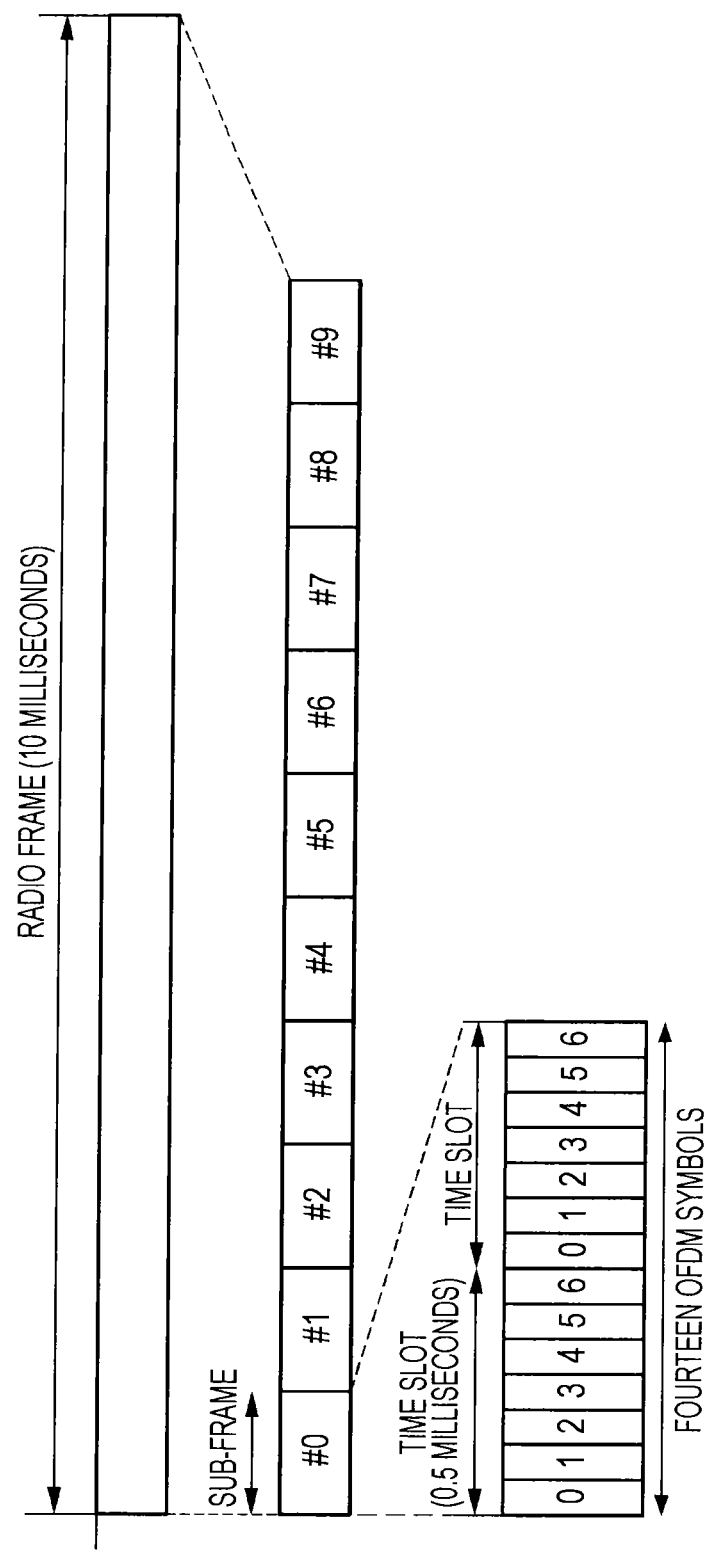
FIG. 21 is a diagram showing a radio frame configuration of a downlink of LTE.

LTE is a communication method based on an OFDM modulation method, and OFDMA is employed in a radio access method of downlink. FIG. 21 shows a radio frame configuration of a downlink of LTE. As shown in the drawing, the radio frame is hierarchized into three layers: a time slot layer, a sub-frame layer, and a radio frame layer in ascending order of time unit.

A 0.5 millisecond time slot is composed of seven OFDM symbols (for normal unicast transmission) and becomes a demodulation processing unit upon reception on the user side (UE terminal). A 1 millisecond sub-frame is composed of two consecutive time slots (fourteen OFDM symbols) and becomes a transmission time unit of one data packet subjected to correction encoding. A 10 millisecond radio frame is composed of ten consecutive sub-frames (that is, twenty time slots) and becomes a basic unit for multiplexing of all physical channels. The sub-frame is divided into a control region PDCCH that is used as a control signal from an eNodeB and a data region PDSCH that is used as user data.

Each user can perform communication without mutual interference when using different sub-carriers or different time slots. In LTE, a minimum unit of radio resource allocation, called "resource block (RB)" is defined by dividing consecutive sub-carriers into blocks. A scheduler installed in a base station (eNodeB) allocates radio resources to respective users in units of resource blocks. The resource block is composed of twelve sub-carriers multiplied by one time slot (seven OFDM symbols=0.5 milliseconds). In addition, up to three OFDM symbols starting from the head of a sub-frame are used as a control channel, that is, PDCCH. The scheduler of a base station can allocate resource blocks for each sub-frame, that is, at intervals of 1 millisecond. Position information of resource blocks is called scheduling. Scheduling information of uplinks and that of downlinks are both written into a control channel of the downlink. Each of the users can recognize resource blocks allocated to the user by viewing the control channel.

The 0.5 millisecond time slot is a minimum allocation unit that can be used by each user. A scheduler installed in a base station (eNodeB) allocates a time slot that may be used in units of time slots for each user. In LTE, two communication systems, i.e., FDD and TDD can be selected. In the case of TDD, it is possible to select which one of an uplink and a downlink to use for each sub-frame.

When CoMP is applied to a LTE-based data communication system, it is important to constitute a CoMP set with a minimum necessary number of eNodeBs satisfying necessary quality for a UE terminal. In addition, when considering the movement of the UE terminal, it is desired to perform dynamic point selection to dynamically update the CoMP set. When updating the point selection, it is necessary to consider a reduction in throughput due to the occupancy of a communication sequence by reference signals in the system, an increase in uplink overhead due to feedback of reference signal measurement results from the UE terminal to the eNodeB, and an increase in power consumption of the UE terminal associated with the measurement of the reference signals and the feedback on the measurement results.

Examples of the reference signal that can be used in the measurement of communication quality of the eNodeB on the UE terminal side and is transmitted from the eNodeB include CRS, CSI-RS, and SRS. In general, the measurement of these reference signals can be used for a variety of purposes. A first purpose is to search an eNodeB of a handover destination by a UE terminal. When quality of a serving eNodeB deteriorates, the UE terminal performs measurement on eNodeBs of adjacent cells in order to search an eNodeB of the next handover destination. A second purpose is to acquire channel quality. In this case, the measurement of reference signals is performed in order to determine a value of precoding used on the eNodeB side upon downlink transmission (a weighting factor of an antenna for performing beam forming), and to assign radio resources to the respective UE terminals by the schedulers of the eNodeBs. Obtaining information necessary for point selection is added as a new object of the measurement of reference signals.

Figure 22:
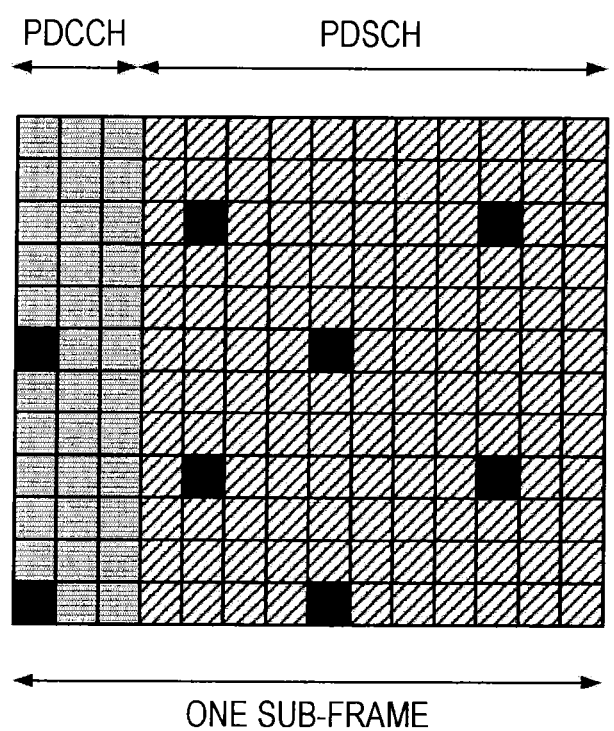
FIG. 22 is a diagram showing an aspect in which CRSs are inserted into a sub-frame.

Here, a cell-specific reference signal (CRS) is a reference signal that is inserted into a downlink sub-frame, and exists from Release 8, that is an initial version of LTE. FIG. 22 shows an aspect in which CRSs are inserted into a sub-frame. In the example shown in FIG. 22, up to three OFDM symbols starting from the head serve as a PDCCH, and the fourth and subsequent OFDM symbols serve as a PDSCH. In the drawing, resource element parts painted out in black correspond to CRSs, and the CRSs are inserted into both the PDCCH and PDSCH regions.

The CRS is transmitted from an eNodeB even when being not transmitted from user data or an eNodeB of the PDSCH. This is because it is assumed that the UE terminal always uses the CRS to acquire synchronization between the UE terminal and the eNodeB, to perform channel estimation, and to measure the quality of the eNodeB.

The CRS uses the same place in each eNodeB (that is, a resource element having the same frequency and the same time direction) (in FIG. 22, a resource element painted out in black is commonly used as a CRS insertion place in each eNodeB). Therefore, it is necessary to secure orthogonality between the eNodeBs, and a signal that is different in sequence is used as a CRS for each eNodeB. 504 sequences exist in total. When the eNodeBs have different cell IDs, these are also different in CRS sequence. The CRS, called a cell-specific reference signal, means that it is unique for each cell.

Since the CRSs are inserted into all the downlink sub-frames, there is no increase in overhead even when the CRSs are used as reference signals for point selection.

A channel state information reference signal (CSI-RS) is a reference signal that is included in a downlink signal. It is not included in all the sub-frames, but inserted every certain cycle. For example, a CSI-RS can be set to be transmitted once per 5 to 80 milliseconds in one sub-frame. The setting of the cycle can be semi-statically updated through radio resource control (RRC) signaling.

The CSI-RS is a reference signal that is newly introduced in Release 10 of 3GPP. In order to perform downlink communication under an antenna environment of 8×8, it is necessary to acquire channels from eight antennas, and the CSI-RS is a reference signal added for this. The UE terminal can be notified of a place to be used to transmit a CSI-RS (reference signal) through dedicated signaling for every eNodeB. Accordingly, the CSI-RS is also a unique signal for each cell, and can be called a cell-specific signal.

The position of a resource element in which a CSI-RS is inserted into a sub-frame can also be changed by setting. A sequence for improving orthogonality between the eNodeBs is also provided for a signal to be inserted.

A case in which the CSI-RS is used as a reference signal for point selection will be examined. Since the transmission cycle can be set in a range of 5 to 80 milliseconds as described above, the CSI-RS is greatly advantageous in that the overhead occupied by reference signals can be reduced. In addition, even when the eNodeBs have the same cell ID, the CSI-RS can be allocated to a different place. As in a case in which CoMP is realized through an integrated control method, even when the same cell ID is allocated to plural pico eNodeBs such as RRHs, the UE terminal can perform measurement by distinguishing the respective RRHs when CSI-RSs are separately set. Accordingly, the inventors of the invention think that the CSI-RS is desirable as a reference signal for point selection.

In addition, a sounding reference signal (SRS) is a reference signal that is included in an uplink sub-frame, and exists from Release 8 of 3GPP. The SRS is inserted over the entire frequency region of the final one among fourteen OFDM symbols in a corresponding sub-frame. The SRS insertion cycle can be changed in a range of 2 to 160 milliseconds. The eNodeB acquires an uplink channel state based on the SRS, and uses the acquired state as information for scheduling.

When using the SRS, it is possible to acquire an uplink channel situation with small overhead. When TDD is applied, channel reversibility is secured. Whereby, in the case of TDD, the SRS can be used in order to acquire a downlink channel situation by the eNodeB.

There are scenarios 1 to 4 as scenarios for realizing CoMP. In the scenario 1, cells are sectorized to perform the CoMP between sectors. In addition, in the scenarios 2 to 4, the CoMP is used using RRHs. However, in the scenario 2, it is assumed that the RRHs perform transmission with the same high power as a macro eNodeB, whereas in the scenarios 3 and 4, it is assumed that the transmission power of the RRHs is small. In the scenario 3, a unique cell ID is allocated for each RRH, whereas in the scenario 4, the same cell ID as the macro eNodeB is allocated to each RRH.

Figure 1:
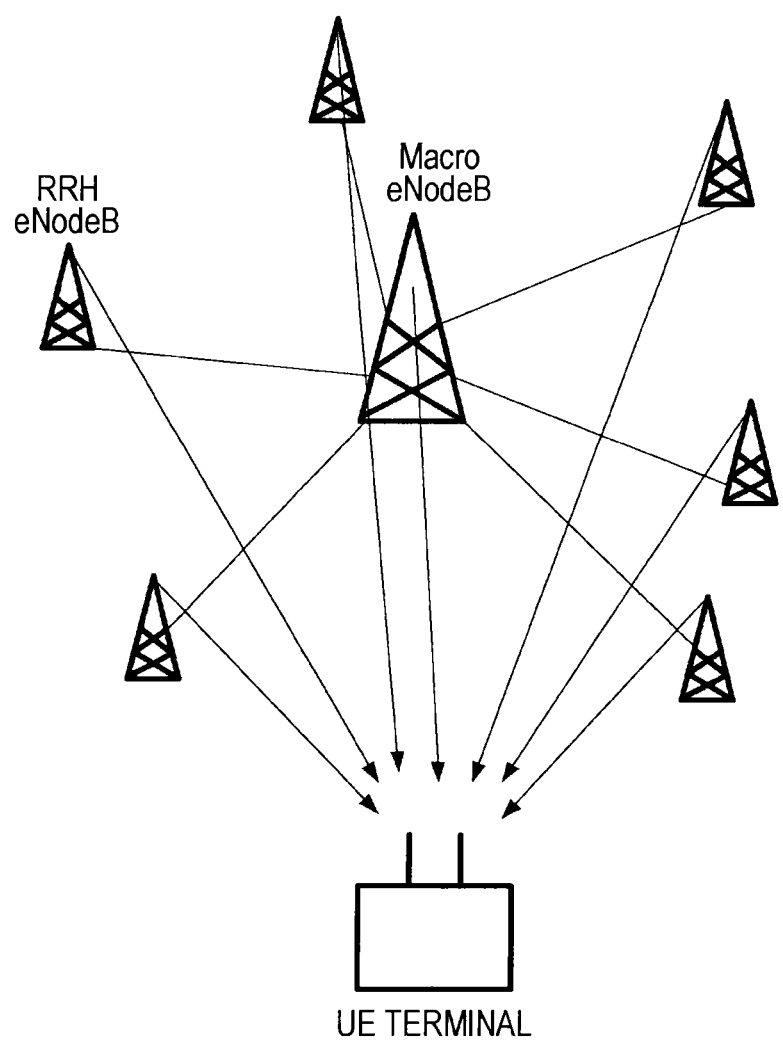
FIG. 1 is a diagram schematically showing a form of connection of a macro eNodeB and plural RRHs subordinate thereto.

FIG. 1 schematically shows a form of connection of a macro eNodeB and plural RRHs subordinate thereto, corresponding to the scenarios 3 and 4. The RHHs are arranged at cell edges and the like as a measure for non-sensing. The macro eNodeB and the respective RHHs (or pico eNodeBs) are connected by baseband signals using an X2 interface composed of an optical fiber and the like. The macro eNodeB performs baseband signal processing and control of the respective RRHs to perform collective radio resource control between the cells. The macro eNodeB and the RRHs simultaneously transmit and receive data to a UE terminal to perform CoMP.

A reference signal that is used in point selection in the system shown in FIG. 1 will be considered.

In the scenario 3, the respective RRHs have a unique cell ID, and are also different in CRS sequence. Accordingly, even when reference signals are simultaneously transmitted from the respective RRHs, the UE terminal can individually acquire quality for each RRH. That is, in the scenario 3, a CRS can be used as a reference signal for point selection.

In the scenario 4, the respective RRHs have the same cell ID as the macro eNodeB allocated thereto, and are also the same in CRS sequence. Therefore, the UE terminal cannot individually acquire quality for each RRH from the CRSs simultaneously transmitted from the respective RRHs. That is, in the scenario 4, it is difficult to use a CRS as a reference signal for point selection. Therefore, in the scenario 4, a CSI-RS is expected as a reference signal for point selection. In that case, it is necessary to allocate a CSI-RS to a different place for each RRH to individually acquire channel information for each RRH on the UE terminal side (as described above, even when the eNodeBs have the same cell ID, a CSI-RS can be allocated to a different place).

In order to dynamically update a CoMP set, that is, in order to realize dynamic point selection, it is necessary to frequently evaluate downlink quality between the UE terminal and the respective eNodeBs. However, in order to frequently perform the evaluation, it is necessary to consider downlink and uplink overhead due to reference signals and an increase in power consumption of the UE terminal as described above.

First Problem when Point Selection is Performed Using CSI-RS:

CRSs are inserted into all downlink sub-frames. Accordingly, it is advantageous in that the UE terminal can frequently measure the quality of each eNodeB using the CRSs and a frequency of changing the CoMP set is increased. However, in the case of the scenario 4, since the macro eNodeB and the respective RRHs connected thereto have the same cell ID and transmit the same CRS, individual measurement for each eNode cannot be performed based on the CRS. That is, in the scenario 4, it is difficult to use a CRS as a reference signal for point selection.

In contrast, a CSI-RS can be used as a reference signal for point selection in the scenario 4. However, due to a long transmission cycle thereof, the measurement frequency is reduced, and thus a point selection update frequency is reduced. A first problem occurs in that when the CSI-RS transmission cycle is reduced, the measurement frequency is improved, but the throughput is reduced.

As means 1 for solving the first problem, the UE terminal uses a CSI-RS as a reference signal for point selection only in the case of the scenario 4, and uses a CRS as a reference signal for point selection in the cases of the scenarios 1 to 3 other than the scenario 4.

In order to realize the means 1, the UE terminal wants to judge which one of a CSI-RS and a CRS is to be used as a reference signal for point selection, in accordance with whether a cell where the UE terminal currently exists is related to the scenario 4 or the scenarios 1 to 3. However, the UE terminal does not grasp whether the cell where the UE terminal currently exists is related to the scenario 4 or the scenarios 1 to 3. Accordingly, a method of designating performing CSI-RS measurement with respect to a UE terminal by an eNodeB, or a method of designating the application of the scenario 4 with respect to a UE terminal by an eNodeB is considered.

In general, CSI-RSs exist and there is a possibility that whether the applied scenario is the scenario 3 or the scenario 4 may be changed for each UE terminal. Accordingly, means for issuing an explicit instruction to the UE terminal from the eNodeB is provided. Specifically, through RRC signaling, the eNodeB notifies the UE terminal of the fact that the measurement of a specific cell ID will be performed using a CSI-RS (that is, a cell ID using a CSI-RS as a reference signal for point selection).

Figure 2:
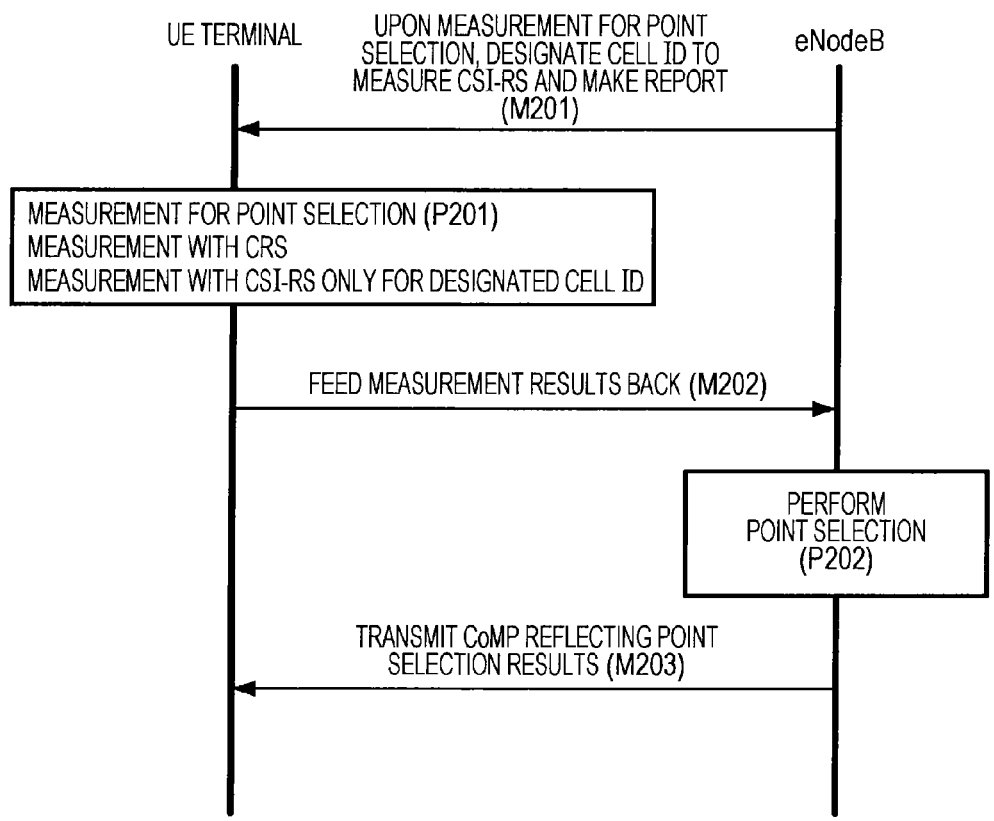
FIG. 2 is a diagram showing an example of a communication sequence in which point selection is performed using a CSI-RS only in a scenario 4.

FIG. 2 shows an example of a communication sequence in which point selection is performed using a CSI-RS only in the scenario 4.

Upon measurement for point selection, the eNodeB issues an instruction to the UE terminal through RRC signaling to perform measurement for point selection using a CSI-RS (not CRS) with regard to designated cell IDs to thus perform feedback (M201).

The UE terminal performs the measurement for point selection (P201). However, in accordance with the above-described instruction, the measurement is performed with a CSI-RS with regard to the designated cell IDs, whereas for cell IDs not designated, the measurement is performed with a CRS. The UE terminal provides feedback to the eNodeB about the results of the measurement of the CRS or the CSI-RS from the eNodeB of each of the cell IDs (M202).

The eNodeB performs point selection based on the feedback information from the UE terminal, and determines a CoMP set for the UE terminal (P202).

Thereafter, data transmission and reception with the UE terminal is performed by the CoMP set that reflects the results of the point selection (M203).

According to the operators, only a single scenario may be applied to all of the cells (operators using the scenario 4 and operators using the scenario 3 are mixed). In contrast, one operator may apply different scenarios for each cell. In these cases, it is necessary for the UE terminal to perform the measurement for point selection corresponding to each scenario.

Second Problem when Point Selection is Performed Using CSI-RS:

When the CSI-RS transmission cycle is long, the overhead is small. However, a second problem occurs in that when the CSI-RS transmission cycle is reduced in order to improve the point selection update frequency, the overhead increases.

As means 2-1 for solving the second problem, the CSI-RS transmission cycle or transmission frequency is controlled in accordance with the number of UE terminals requiring CoMP.

For example, when the CSI-RS transmission cycle is lengthened, the overhead is reduced and the power consumption on the eNodeB side is also reduced. The CSI-RS transmission cycle may be lengthened based on the thought that when the number of UE terminals requiring CoMP is small, the point selection update frequency may be reduced.

In contrast, when the CSI-RS transmission cycle is shortened, the point selection update frequency is improved, and thus an unnecessary eNodeB can be promptly eliminated from the CoMP set and the radiation of unnecessary radio waves to the neighborhood can be reduced. The CSI-RS transmission cycle may be shortened based on the thought that when the number of UE terminals requiring CoMP is small, the load on the eNodeBs that perform the point selection is small.

In order to realize the means 2-1, for example, means for grasping the number of UE terminals requiring CoMP and means for controlling the CSI-RS transmission cycle based on the number of UE terminals requiring CoMP are provided on the eNodeB side.

The UE terminals requiring CoMP are considered as UE terminals existing at cell edges. Therefore, the eNodeBs can estimate the number of UE terminals requiring CoMP, based on a timing advantage value and the number of UE terminals that are judged to be arranged in the distance by the power control.

Figure 3:
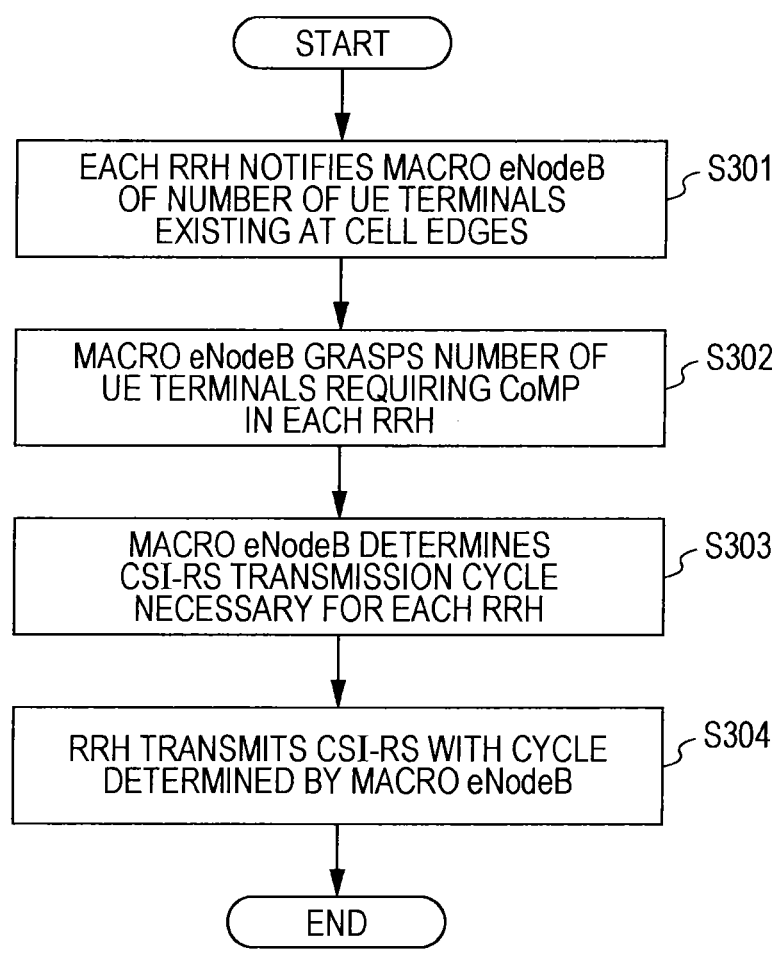
FIG. 3 is a flowchart showing processing procedures for controlling a CSI-RS transmission cycle based on the number of UE terminals requiring CoMP.

FIG. 3 shows processing procedures for controlling the CSI-RS transmission cycle based on the number of UE terminals requiring CoMP in a flowchart format.

First, when each RRH grasps the number of UE terminals existing at cell edges based on a timing advantage value and power control, the macro eNodeB is notified of the grasped information (Step S301).

When each RRH grasps the number of UE terminals requiring CoMP (Step S302), the macro eNodeB determines a CSI-RS transmission cycle necessary for each RRH based on the number of terminals (Step S303), and each RRH is notified of the determined information.

Each RRH transmits a CSI-RS with the transmission cycle determined by the macro eNodeB (Step S304).

As means 2-2 for solving the second problem, the point selection update frequency is improved using both of an SRS and a CSI-RS as a reference signal for point selection.

The SRS is a reference signal that is included in an uplink sub-frame (described above). When TDD is applied, channel reversibility is secured. Whereby, the eNodeB can use the SRS in order to acquire a downlink channel situation.

Figure 4:
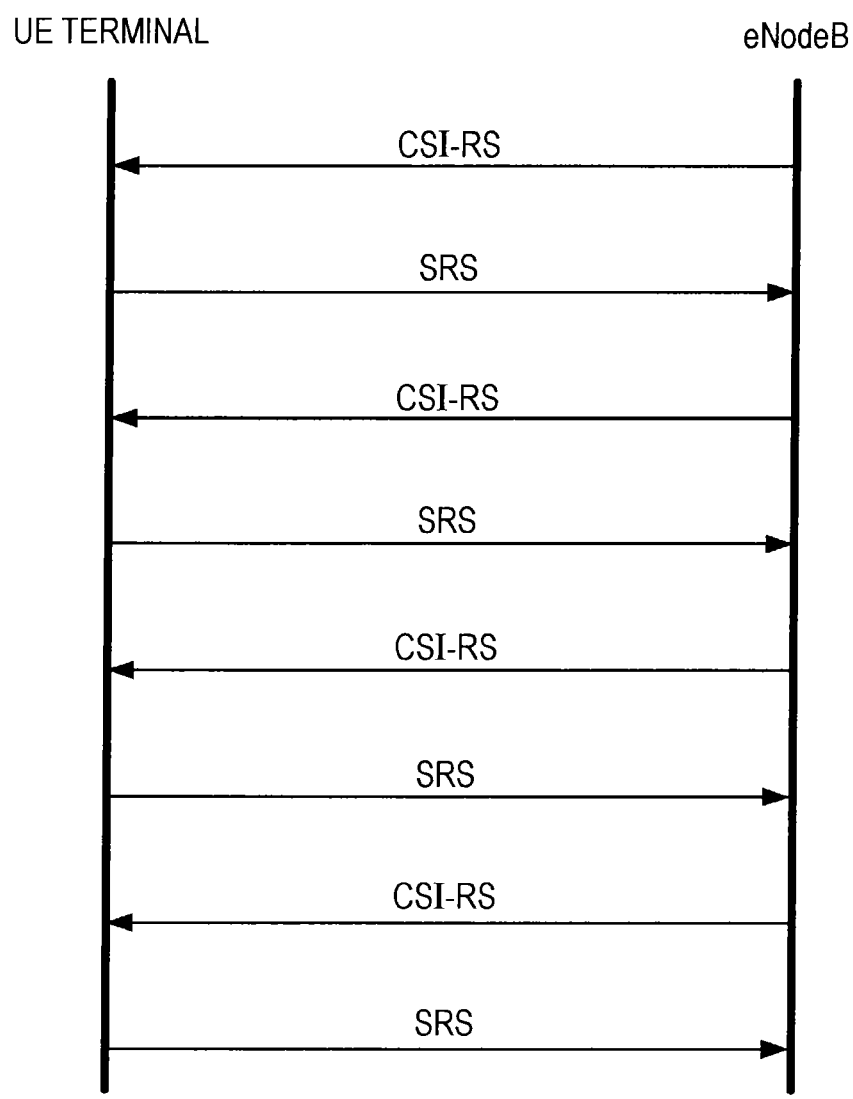
FIG. 4 is a diagram showing an example of a communication sequence in which measurement for point selection is performed using both of an SRS and a CSI-RS.

FIG. 4 shows an example of a communication sequence in which measurement for point selection is performed using both of an SRS and a CSI-RS. TDD is applied in the cell.

A CSI-RS is transmitted from the eNodeB with a predetermined transmission cycle. The UE terminal performs measurement for point selection using the CSI-RS, and the eNodeB is notified of the results of the measurement.

In addition, using an SRS included in a sub-frame of an uplink from the UE terminal, the eNodeB performs measurement for point selection. The radio frame of the uplink from the UE terminal is not particularly limited. For example, in the measurement, the UE terminal can use an SRS included in a radio frame that feeds the results of the measurement for point selection back.

The eNodeB performs point selection based on the results of the measurement fed back from the UE terminal and the results of the measurement performed in the eNodeB, and determines a CoMP set for this UE terminal. Since the measurement for updating the point selection is dispersed to both of the UE terminal and the eNodeB, the measurement load on the UE terminal is reduced. Thereafter, data transmission and reception with the UE terminal is performed by the CoMP set that reflects the results of the point selection.

When TDD is applied, downlink channel quality can be specified from an SRS of an uplink. Accordingly, as shown in FIG. 4, using s SRS and a CSI-RS in combination for dynamic point selection, downlink overhead is reduced, and a load on the measurement of the UE terminal can be suppressed. When a CSI-RS transmission frequency is increased in order to improve the point selection update frequency, only downlink overhead increases. However, when an SRS and a CSI-RS are used in combination, overhead that is applied to the uplink and the downlink can be equalized.

In FDD, since uplinks and downlinks are different in channel, reversibility is not secured. Accordingly, the means 2-2 is effective only in a transmission mode of the TDD.

Third Problem when Point Selection is Performed Using CSI-RS:

A third problem occurs in that when the UE terminal meaninglessly performs measurement for point selection, the power consumption is uselessly increased.

As means 3-1 for solving the third problem, the UE terminal performs measurement by receiving a reference signal only when the moving speed of the UE terminal is high, and thus the point selection update frequency should be improved.

For example, the UE terminal does not receive all of CSI-RSs transmitted with a predetermined cycle from the eNodeBs to perform the measurement. The UE terminal determines a necessary measurement cycle in accordance with a moving speed of the UE terminal to selectively receive CSI-RSs, and feeds the results of the measurement thereof back to the eNodeBs to perform the point selection.

Figure 5:
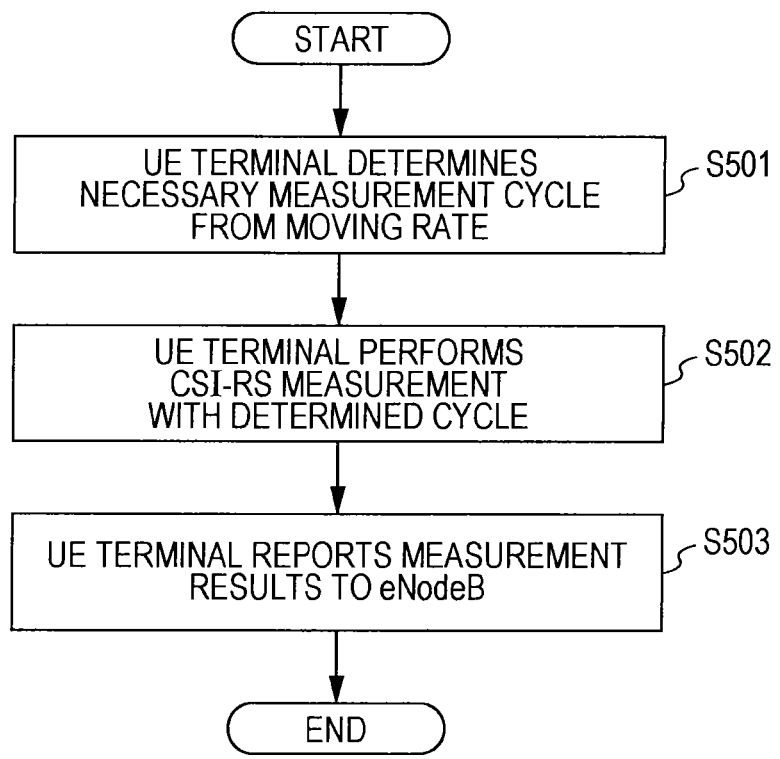
FIG. 5 is a flowchart showing processing procedures for feeding measurement results back to eNodeBs by a UE terminal with a measurement cycle according to a moving speed of the UE terminal.

FIG. 5 shows processing procedures for feeding measurement results back to the eNodeBs by the UE terminal with a measurement cycle according to the moving speed of the UE terminal in a flowchart format.

The UE terminal determines a necessary reference signal measurement cycle based on the moving speed of the UE terminal (Step S501).

Based on the determined measurement cycle, the UE terminal performs measurement of reference signals such as CSI-RSs transmitted with a predetermined cycle from the eNodeBs (Step S502), and feeds the results of the measurement back to the eNodeBs (Step S503).

Figure 6:
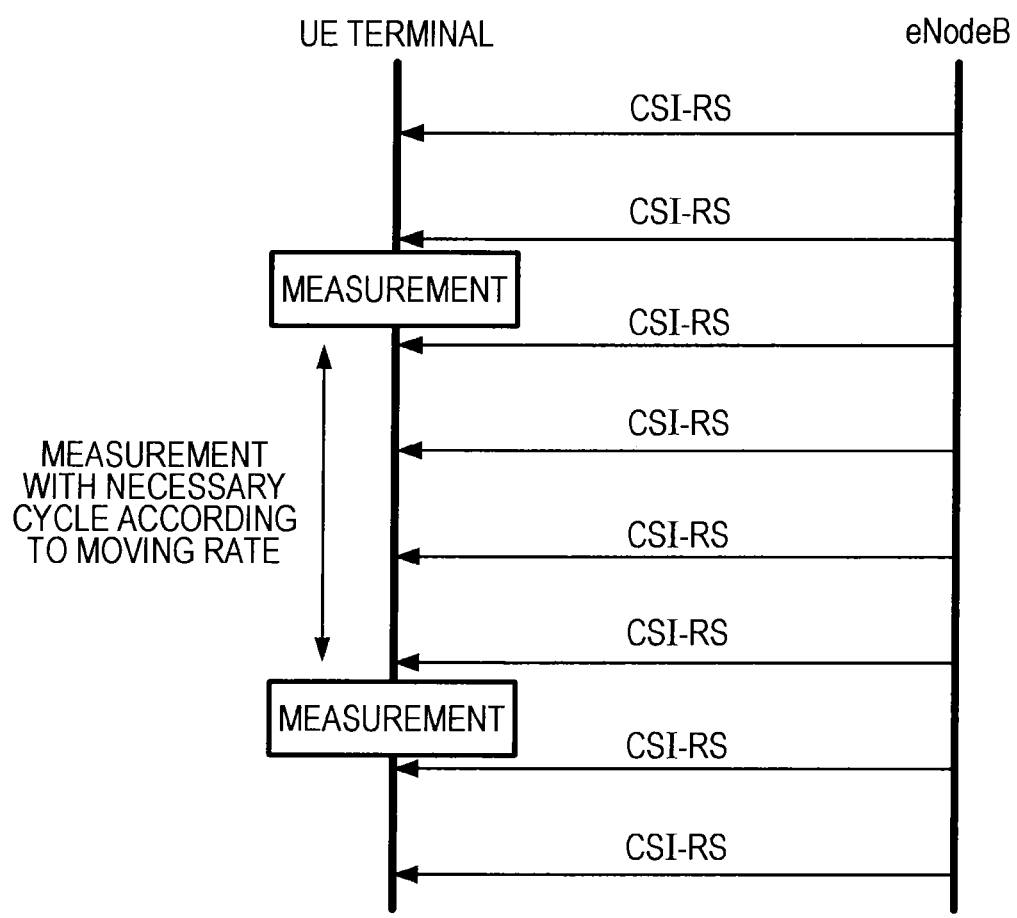
FIG. 6 is a diagram showing an example of a communication sequence in which the eNodeB transmits a CSI-RS with a predetermined transmission cycle, whereas the UE terminal receives a CSI-RS with a measurement cycle set by the UE terminal.

FIG. 6 shows an example of a communication sequence in which the eNodeB transmits a CSI-RS with a predetermined transmission cycle, whereas the UE terminal receives a CSI-RS with a measurement cycle set by the UE terminal. From the eNodeB, a CSI-RS is transmitted with a transmission cycle for, for example, realizing dynamic point selection with an update frequency desired by an operator. The UE terminal selectively measures CSI-RSs with a uniquely set measurement cycle. The UE terminal can set the measurement cycle in accordance with the moving speed of the UE terminal as described above. However, the measurement cycle may be set in consideration of other situations.

In this manner, since the UE terminal performs selective measurement with a CSI-RS cycle to omit unnecessary measurement, it is possible to reduce the power consumption of the UE terminal.

As means 3-2 for solving the third problem, the reference signal measurement frequency is controlled according to the quality in the CoMP set.

The means 3-2 can be used in a scenario in which an unnecessary eNodeB is eliminated from the CoMP set. In this case, only for an eNodeB exhibiting a deterioration in quality among the eNodeBs in the CoMP set, the UE terminal raises the reference signal measurement frequency. For example, the UE terminal selectively measures CSI-RSs transmitted with a predetermined cycle from the respective eNodeBs included in the CoMP set with a measurement cycle set by the UE terminal (that is longer than the transmission cycle). When there is an eNodeB reaching a quality deterioration threshold among the eNodeBs of the CoMP set, the measurement cycle is reduced only for the eNodeB so that the measurement is frequently performed. The means 3-2 is similar to the means 3-1 in that the UE terminal omits unnecessary measurement.

In general handover, the reference signal measurement is started with a deterioration in quality of a serving eNodeB as a trigger. In the case of point selection, the reference signal measurement is performed, but the measurement frequency is raised for one exhibiting a large deterioration in quality among the eNodeBs included in the CoMP set.

Figure 7:
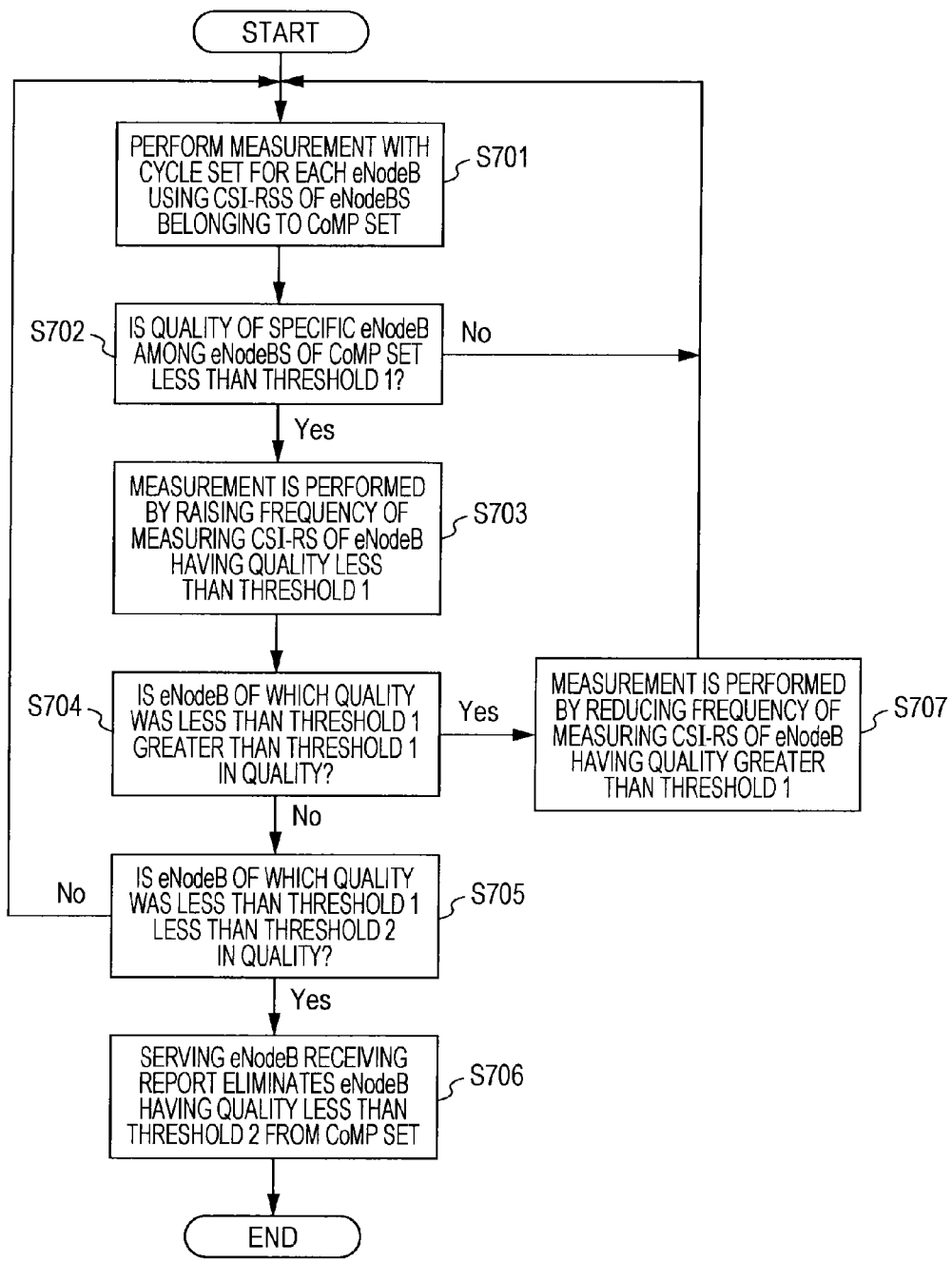
FIG. 7 is a flowchart showing processing procedures for eliminating an eNodeB exhibiting a large deterioration in quality from a CoMP set by controlling a reference signal measurement frequency.

By controlling the measurement frequency for a specific eNodeB, for example, it is possible to realize dynamic point selection in which an eNodeB exhibiting a large deterioration in quality is eliminated from the CoMP set. FIG. 7 shows processing procedures for eliminating an eNodeB exhibiting a large deterioration in quality from the CoMP set by controlling the reference signal measurement frequency in a flowchart format. In the processing procedures shown in FIG. 7, two kinds of thresholds, i.e., a threshold 1 for judging whether to raise the measurement frequency and a threshold 2 for judging whether to perform elimination from the CoMP set are used as quality deterioration thresholds.

The UE terminal performs measurement with a measurement cycle set for each eNodeB by using CSI-RSs from the eNodeBs belonging to the CoMP set (Step S701).

Here, when a fact that the quality of a specific eNodeB among the eNodeBs of the CoMP set is less than the quality deterioration threshold 1 is detected (Yes in Step S702), the UE terminal performs the measurement with a CSI-RS measurement frequency raised with regard to the eNodeB (Step S703).

Thereafter, when a fact that the quality of the eNodeB that was less than the threshold 1 is recovered, and is thus greater than the threshold 1 is confirmed (Yes in Step S704), the UE terminal performs the measurement with a CSI-RS measurement frequency reduced with regard to the eNodeB (Step S707).

However, when a fact that the quality of the eNodeB that was less than the threshold 1 is not recovered and further less than the quality deterioration threshold 2 is detected (Yes in Step S705), the serving eNodeB receiving such a measurement result performs dynamic point selection to eliminate the eNodeB of which the quality is less than the threshold 2 from the CoMP set (Step S706).

Figure 8:
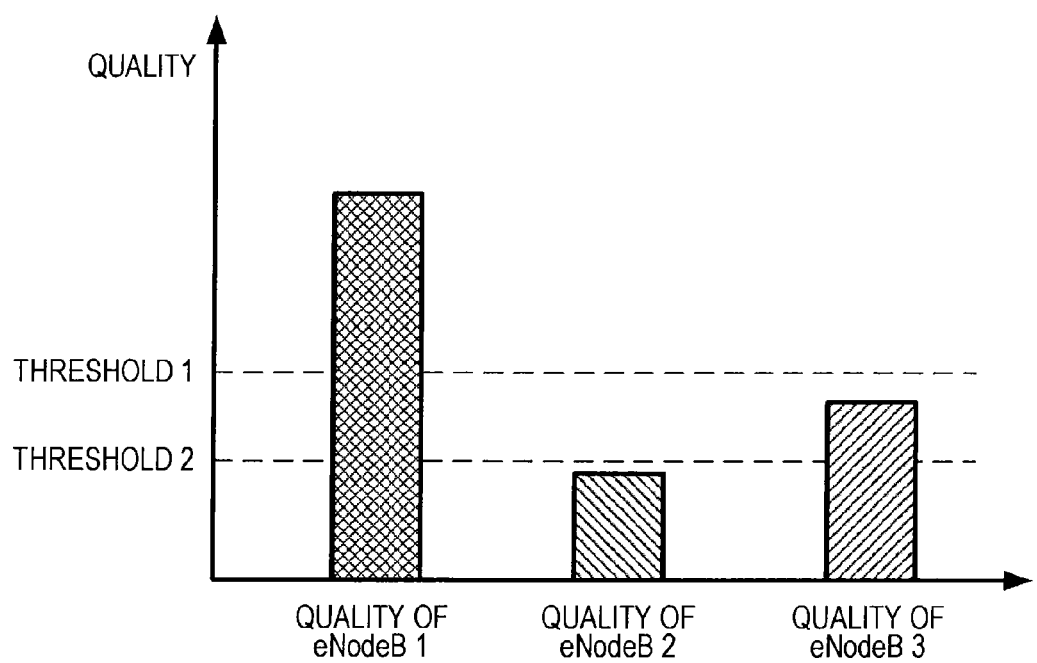
FIG. 8 is a diagram schematically showing results of measurement of the quality of each eNodeB by the UE terminal.

FIG. 8 schematically shows the results of the measurement of the quality of each eNodeB by the UE terminal. In the example shown in the drawing, the UE terminal performs CSI-RS measurement on eNodeBs #1 to #3. Since the quality of the eNodeB#1 is greater than the threshold 1, the measurement frequency is not raised. In addition, since the quality of the eNodeB#2 is less than the threshold 2, the eNodeB#2 is eliminated from the CoMP set through dynamic point selection. In addition, since the quality of the eNodeB#3 is less than the threshold 1, but greater than the threshold 2, the measurement is performed with the raised measurement frequency.

The means 3-2 can also be used in a scenario in which an eNodeB to be newly added to the CoMP set is searched. In this case, the quality of a specific eNodeB does not deteriorate, but when the quality is not maintained as a whole with receiving power of the eNodeBs included in the current CoMP set, it is necessary to search an eNodeB that is expected to have higher receiving power, and thus the measurement frequency is raised.

Figure 9:
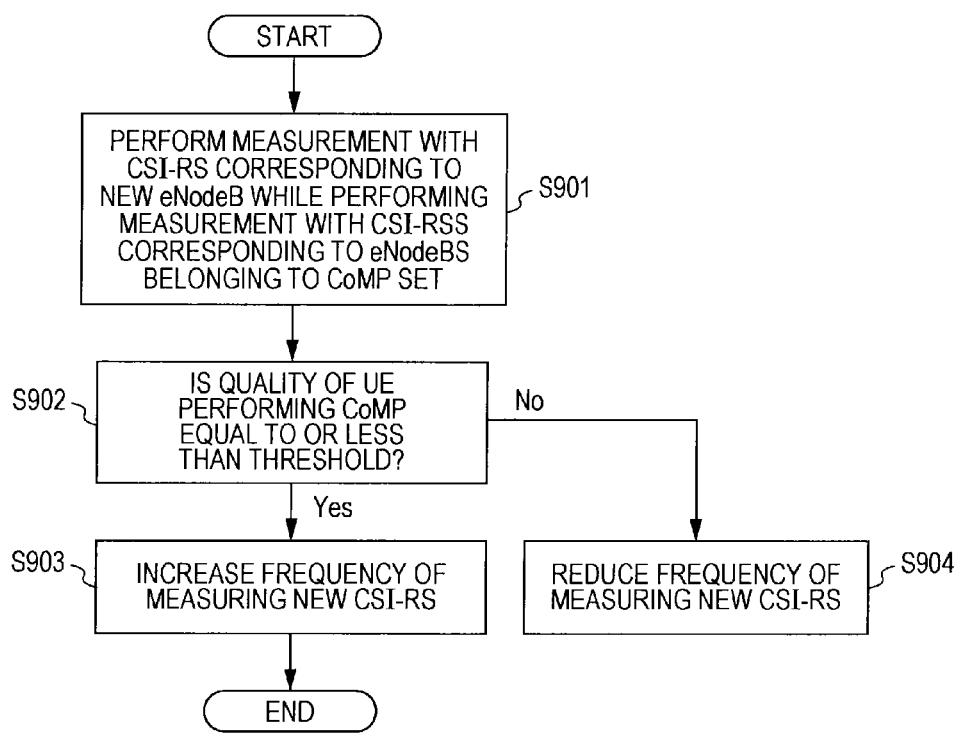
FIG. 9 is a flowchart showing processing procedures for searching an eNodeB to be newly added to the CoMP set by controlling the reference signal measurement frequency.

FIG. 9 shows processing procedures for searching an eNodeB to be newly added to the CoMP set by controlling the reference signal measurement frequency in a flowchart format.

The UE terminal performs measurement with a CSI-RS corresponding to a new eNodeB while performing measurement for point selection using CSI-RSs corresponding to the respective eNodeBs included in the CoMP set (Step S901).

Here, when receiving quality of the UE terminal performing the CoMP is equal to or less than a predetermined threshold (Yes in Step S902), the UE terminal increases the measurement frequency for the new eNodeB (Step S903).

In contrast, when the receiving quality of the UE terminal performing the CoMP exceeds a predetermined threshold (No in Step S902), the UE terminal reduces the measurement frequency for the new eNodeB (Step S904).

As means 3-3 for solving the third problem, the frequency of measuring a reference signal for point selection is controlled on the eNodeB side, or the frequency of measuring a reference signal is controlled on the UE terminal side in accordance with the number of base stations existing in an area to which the UE terminal is moved.

For example, when the UE terminal is moved to an area in which there is a large number of base stations for performing the CoMP, the cycle of CSI-RS transmission from the eNodeB is reduced, and the measurement frequency is raised on the UE terminal side. In contrast, when the UE terminal is moved to an area in which there is a small number of base stations for performing the CoMP, the cycle of CSI-RS transmission from the eNodeB is lengthened, and the measurement frequency is reduced on the UE terminal side.

Figure 10:
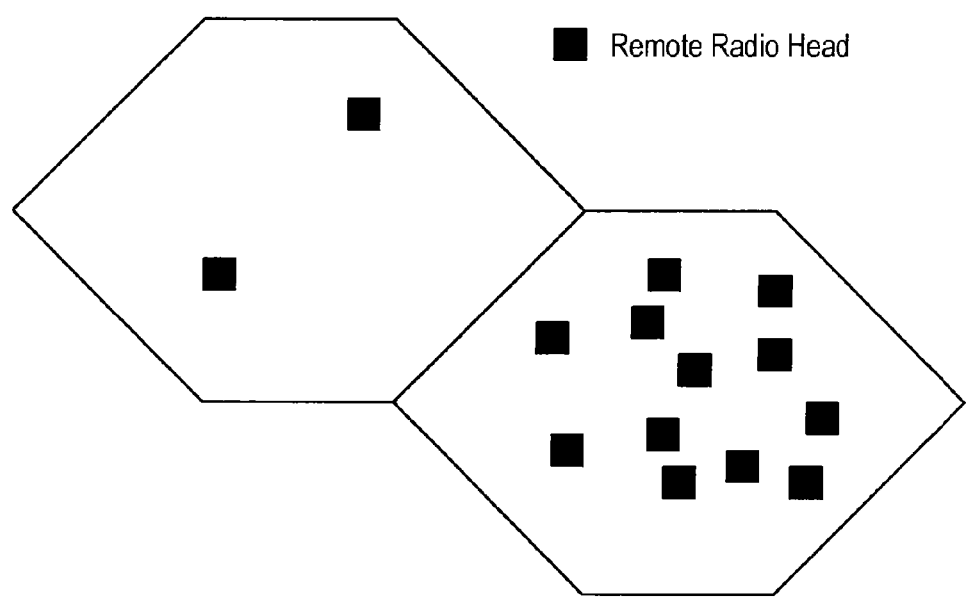
FIG. 10 is a diagram showing an example of distribution of RRHs existing in cells.

FIG. 10 shows an example of distribution of RRHs existing in cells. When there is a large number of RRHs, that is, base stations for performing CoMP as in the cell shown on the right side of FIG. 10, RRHs necessary for performing CoMP are changed even with a small movement of the UE terminal. Therefore, it is necessary to improve the point selection update frequency, and the measurement frequency is raised on the UE terminal side. In contrast, when the number of RRHs, that is, base stations for performing CoMP is small as in the cell shown on the left side of FIG. 10, base stations necessary for performing CoMP are rarely changed with a movement of the UE terminal, and thus it is not necessary to raise the point selection update frequency.

Figure 11:
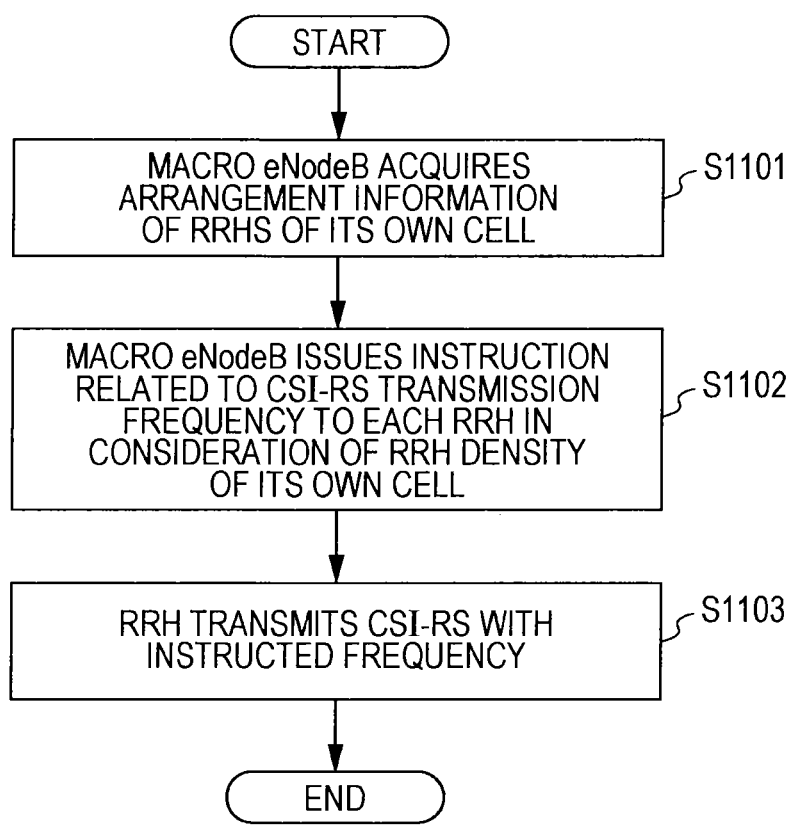
FIG. 11 is a flowchart showing processing procedures for controlling a frequency of transmitting a CSI-RS from the eNodeB in accordance with RRH density.

FIG. 11 shows processing procedures for controlling a frequency of transmitting a CSI-RS from the eNodeB in accordance with RRH density in a flowchart format.

The macro eNodeB acquires arrangement information of RRHs in its own cell (Step S1101).

The macro eNodeB issues an instruction related to the CSI-RS transmission frequency to each RRH in consideration of the RRH density in its own cell (Step S1102).

The RRH transmits a CSI-RS with the transmission frequency instructed from the macro eNodeB (Step S1103).

Figure 12:
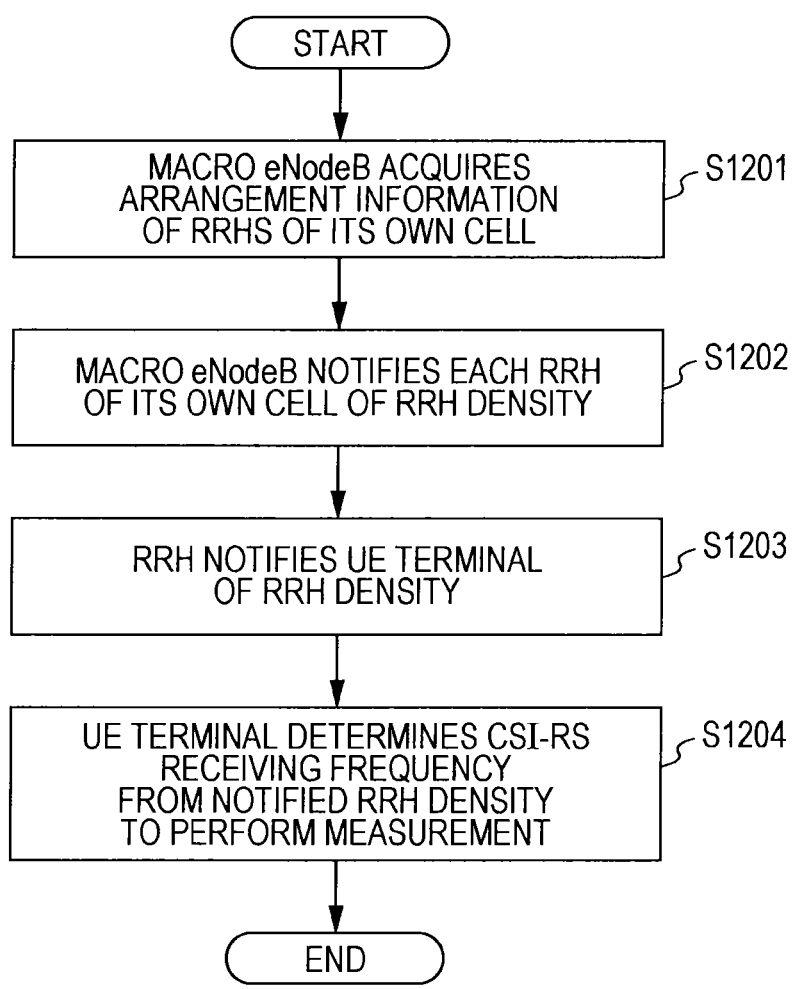
FIG. 12 is a flowchart showing processing procedures for controlling a frequency of receiving a CSI-RS from the eNodeB by the UE terminal in accordance with RRH density.

FIG. 12 shows processing procedures for controlling a frequency of receiving a CSI-RS from the eNodeB by the UE terminal in accordance with RRH density in a flowchart format.

When acquiring arrangement information of RRHs in its own cell (Step S1201), the macro eNodeB notifies each RRH in its own cell of RRH density (Step S1202).

Each RRH further notifies the UE terminal of the notified RRH density (Step S1203).

The UE terminal determines a frequency of receiving a CSI-RS based on the notified RRH density to perform measurement for point selection (Step S1204).

Fourth Problem when Point Selection is Performed Using CSI-RS:

A carrier aggregation technology is introduced to LTE. The carrier aggregation can realize bandwidth extension by performing communication by simultaneously using plural carriers, called component carriers. For example, five component carriers having a 20 MHz bandwidth are bundled together to perform communication at a bandwidth of 20 MHz×5=100 MHz.

When the system is utilized using a combination of the carrier aggregation and the above-described CoMP technology, the channel is different for each component carrier, and thus it is assumed that the respective component carriers are totally different in CoMP application situation. That is, whether CoMP is applied is different for each component carrier, and the configuration of eNodeBs included in a CoMP set is also different even when the CoMP is applied. However, a fourth problem occurs in that when the measurement frequency for point selection is uniform in the respective component carriers, wastefulness occurs.

As means 4-1 for solving the fourth problem, the frequency of transmitting a CSI-RS is controlled in accordance with a degree of CoMP recommendation with respect to each component carrier. That is, in the means 4-1, in the case of a component carrier recommending CoMP, the frequency of transmitting a CSI-RS is increased.

Figure 13:
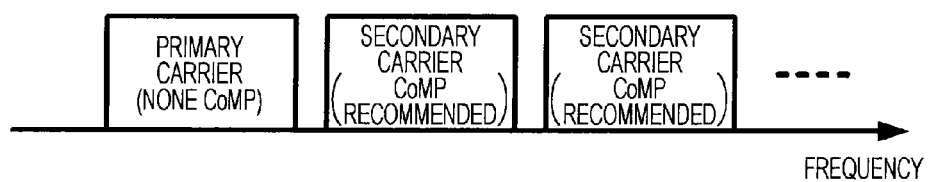
FIG. 13 is a diagram showing an example of utilization of secondary carriers as component carriers specialized for CoMP when carrier aggregation and a CoMP technology are combined.

Among the plural component carriers, one primary carrier is referred to as "primary carrier", and one or more other carriers are referred to as "secondary carriers". Here, from the viewpoint of protection of the primary carrier, CoMP is not recommended for the primary carrier. In other words, the secondary carriers are utilized as component carriers specialized for CoMP (see FIG. 13). The CSI-RS transmission frequency of the secondary component carriers, rather than the primary component carrier, is increased.

In addition, from the viewpoint of data offload, when CoMP in a component carrier 1 is crowded and CoMP in a component carrier 2 is thus to be increased, the frequency of transmitting a CSI-RS that is transmitted by the component carrier 2 is increased.

Figure 14:
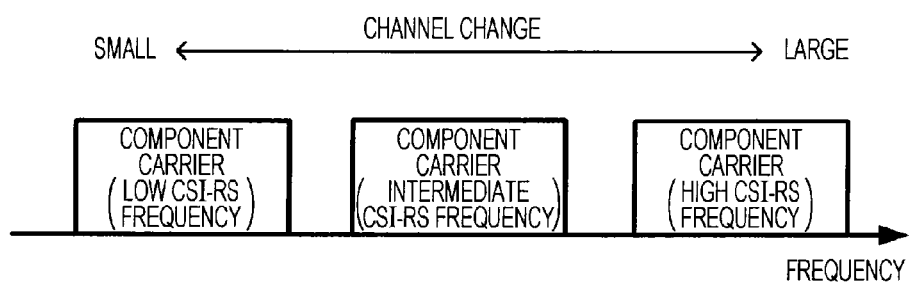
FIG. 14 is a diagram showing an example of control of a CSI-RS transmission frequency in a component carrier in accordance with frequency when carrier aggregation and a CoMP technology are combined.

As means 4-2 for solving the fourth problem, the frequency of transmitting a CSI-RS is controlled in accordance with a change in the channels of the component carriers. A component carrier of high frequency has a larger channel change than a component carrier of low frequency. Accordingly, in the component carrier of high frequency, a higher CSI-RS transmission frequency is set than in the component carrier of low frequency (see FIG. 14).

As means 4-3 for solving the fourth problem, component carriers adjacent to each other on the frequency axis share reference signal measurement results to reduce the frequency of transmitting a CSI-RS over the entire system.

In the carrier aggregation, component carriers that are consecutively arranged on the frequency axis, or component carriers that are arranged adjacent to each other may have remarkably similar channel information. In many cases, at least the quality of the entire eNodeBs is sufficient when measured in any one of the component carriers.

Figure 15:
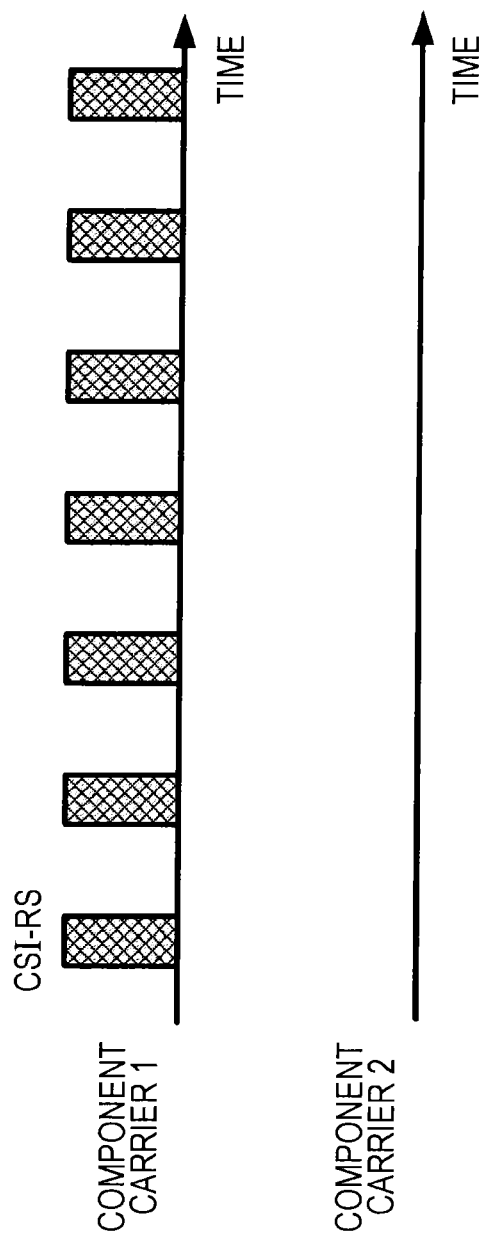
FIG. 15 is a diagram showing an example in which CSI-RSs are transmitted to only one of a component carrier 1 and a component carrier 2 adjacent to each other on a frequency axis.

For example, when the component carrier 1 and the component carrier 2 are adjacent to each other on the frequency axis, as shown in FIG. 15, only the component carrier 1 transmits CSI-RSs, the other component carrier 2 transmits no CSI-RSs, and the measurement results in the component carrier 2 are used.

Figure 16:
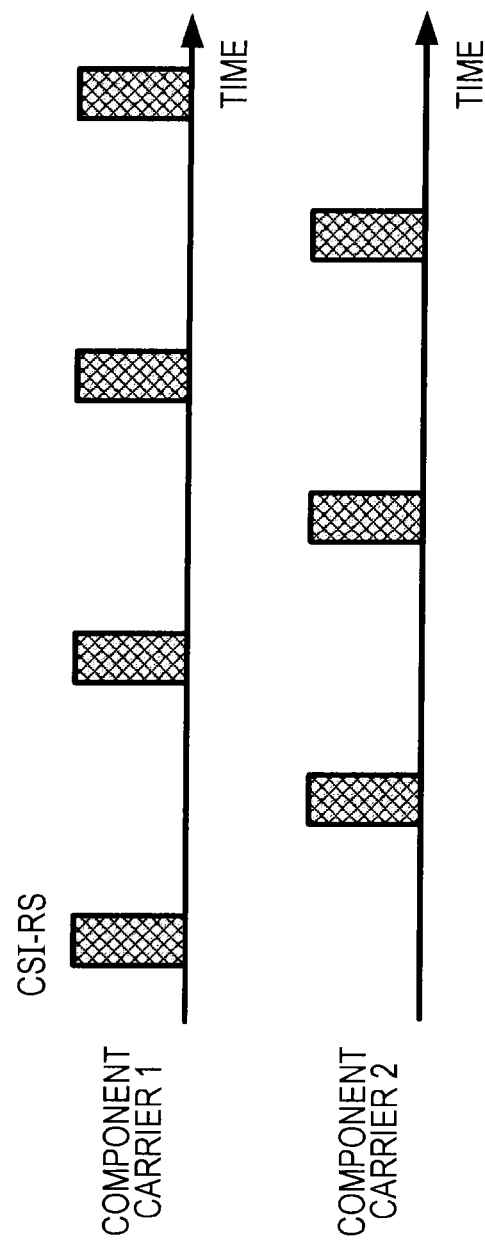
FIG. 16 is a diagram showing an example in which CSI-RS transmission is shared by the component carrier 1 and the component carrier 2 adjacent to each other on the frequency axis so that there is no overlap on a time axis and the frequency axis.

Otherwise, when the component carrier 1 and the component carrier 2 are adjacent to each other on the frequency axis, as shown in FIG. 16, the component carrier 1 and the component carrier 2 may share the transmission of CSI-RSs so that the CSI-RSs do not overlap on the time axis and the frequency axis.

Fifth Problem when Point Selection is Performed Using CSI-RS:

When the number of RRHs belonging to the macro eNodeB is large and the respective RRHs transmit CSI-RSs, a fifth problem occurs in that overhead increases due to the CSI-RSs, and thus downlink throughput is reduced.

As means 5 for solving the fifth problem, the CSI-RS transmission cycle of the RRH is controlled in accordance with a usage situation in the CoMP set.

Even RRHs or eNodeBs belonging to the same CoMP set can be divided into RRHs that are normally included in the CoMP set and RRHs that are rarely included in the CoMP set by measurement by the UE terminal. The CSI-RSs of the RRHs that are normally used by the CoMP should be transmitted with a short cycle, and the CSI-RSs of the eNodeBs that are rarely used in the CoMP should be transmitted with a long cycle.

For example, the serving eNodeB may count the number of UE terminals that are in a radio link control-connected (that is, RRC-connected) state with the respective RRHs to set a CSI-RS transmission frequency for each RRH in accordance with the number of UE terminals that are in a radio link control-connected state.

Figure 17:
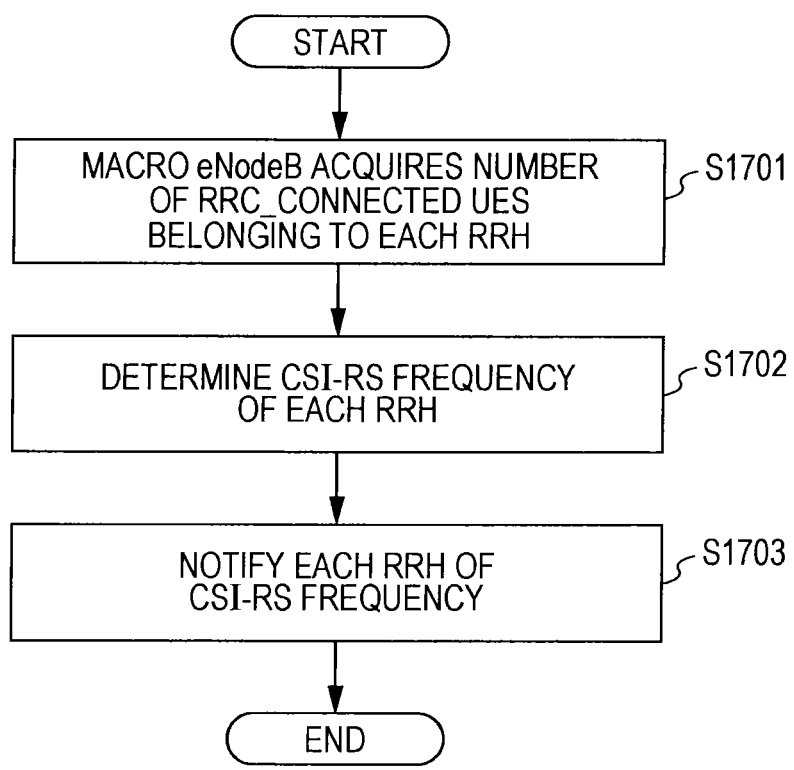
FIG. 17 is a flowchart showing processing procedures for controlling a CSI-RS transmission cycle of an RRH in accordance with a usage situation in the CoMP set.

FIG. 17 shows processing procedures for controlling the CSI-RS transmission cycle of the RRH in accordance with a usage situation in the CoMP set in a flowchart format.

The macro eNodeB acquires the number of UE terminals that are in a radio link control-connected (that is, RRC-connected) state (Step S1701).

When the CSI-RS transmission frequency is set for each RRH in accordance with the number of UE terminals that are in a radio link control-connected state (Step S1702), the macro eNodeB notifies each RRH of the set CSI-RS transmission frequency (Step S1703).

Device Configuration

Figure 18:
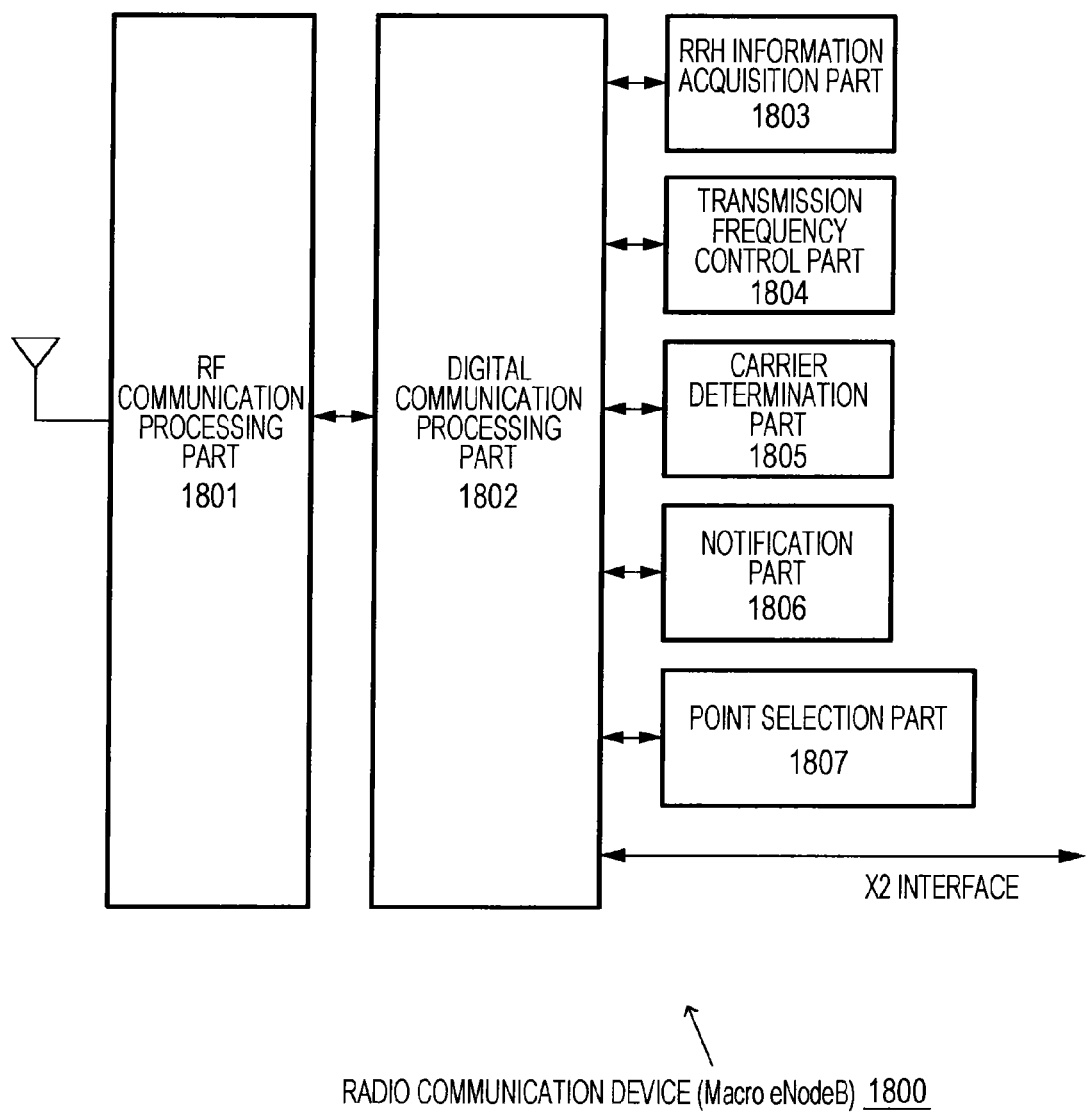
FIG. 18 is a diagram schematically showing an example of a configuration of a radio communication device 1800 that is operated as a macro eNodeB.

FIG. 18 schematically shows an example of a configuration of a radio communication device 1800 that is operated as a macro eNodeB in the radio communication system (FIG. 1) according to this exemplary embodiment. In FIG. 18, functional modules that perform basic operations as a macro eNodeB, such as radio resource management in the macro cell, transmission of various reference signals, RRC signaling to the UE terminal, and measurement of a reference signal SRS included in a radio frame of an uplink from the UE terminal, are appropriately omitted.

The radio communication device 1800 is provided with a RF communication processing part 1801 that performs analog processing of radio signals that are transmitted and received by an antenna and a digital communication processing part 1802 that performs modulation processing of digital transmission signals and demodulation processing of digital reception signals. The digital communication processing part 1802 exchanges transmission and reception data with an upper layer protocol of a communication layer of the device 1800. In addition, the digital communication processing part 1802 communicates with other eNodeBs through an X2 interface, a serving gateway (S-GW), and a mobility management entity (MME). In addition, the digital communication processing part 1802 performs baseband signal processing and control of the respective RRHs subordinate to the device 1800 through the X2 interface.

A RRH information acquisition part 1803 acquires, from each RRH, information related to the RRH subordinate to the device 1800 using the X2 interface such as an optical fiber. The RRH information acquisition part 1803 acquires, from each RRH, information necessary for realizing the above-described means 2-1, 3-3, and 6. Examples of the acquired information include the number of UE terminals that are in a radio link control-connected (that is, RRC-connected) state with the RRHs, and the RRH density in its own cell.

A transmission frequency control part 1804 controls the CSI-RS transmission frequency of each RRH subordinate to the device 1800. The transmission frequency control part 1804 functions as any of the above-described means 2-1, 2-2, 3-3, 4-1, 4-2, 4-3, and 5.

A carrier determination part 1805 determines the importance of performing CoMP for each component carrier upon carrier aggregation. The carrier determination part 1805 performs determination for judging a component carrier that will use CoMP (or that are recommended to use CoMP) in the realization of the above-described means 5-1.

A notification part 1806 notifies each pico eNodeB (including RRH) subordinate to the device 1800 of the CSI-RS transmission frequency determined by the transmission frequency control part 1804. If necessary, the notification part 1806 notifies the UE terminal belonging to the pico eNodeB of the CSI-RS measurement frequency and the like. In the realization of the above-described means 2-1, 3-3, 4-1, 4-2, 4-3, and 5, the notification part 1806 performs notification to the corresponding pico eNodeB. In addition, in the realization of the above-described means 1 and 3-3, the notification part 1806 performs necessary notification to the UE terminal.

As a result of the notification of the notification part 1806, the radio communication device 1800 can acquire results of the CSI-RS measurement, that is, feedback for point selection from the UE terminal with desired frequency. A point selection part 1807 configures a CoMP set with a minimum necessary number of eNodeBs satisfying necessary quality for the UE terminal based on the feedback information. In addition, the point selection part 1807 performs point selection based on both of the feedback information from the UE terminal and results of the measurement of SRSs included in an uplink from the UE terminal to realize the above-described means 2-2.

Figure 19:
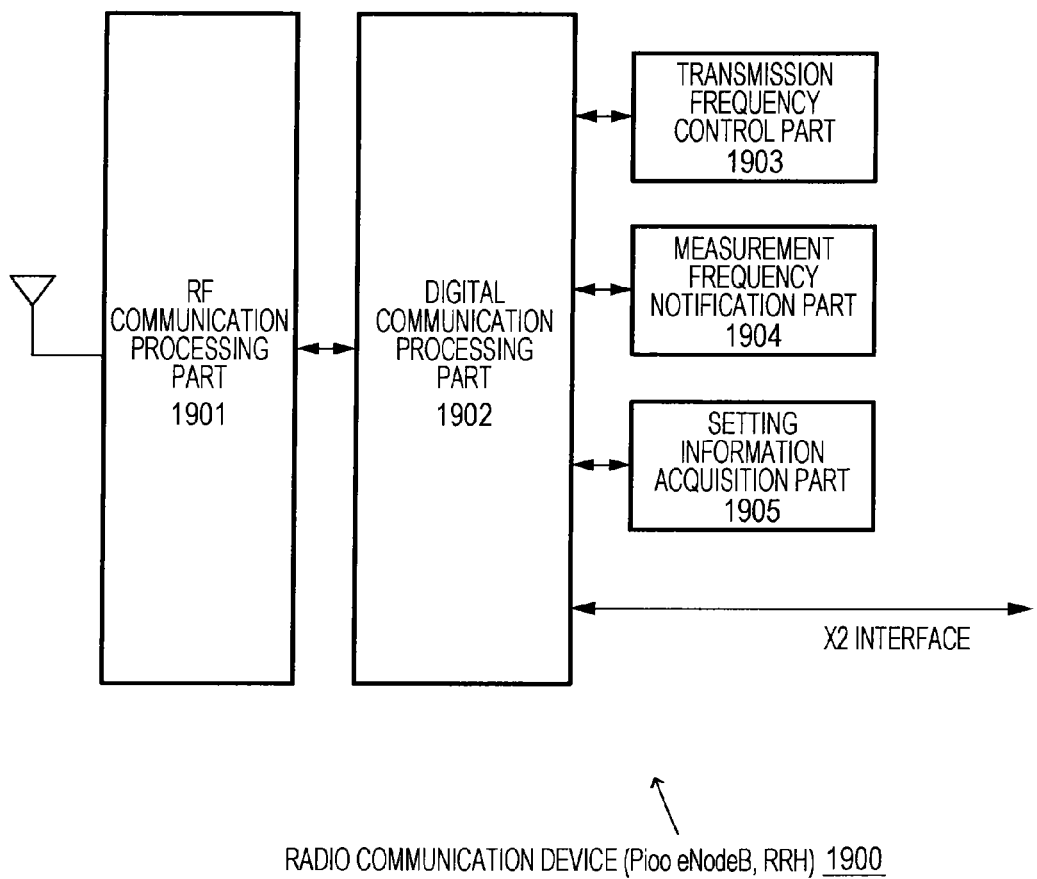
FIG. 19 is a diagram schematically showing an example of a configuration of a radio communication device 1900 that is operated as a pico eNodeB or a RRH.

FIG. 19 schematically shows an example of a configuration of a radio communication device 1900 that is operated as a pico eNodeB or a RRH in the radio communication system (FIG. 1) according to this exemplary embodiment. In FIG. 19, functional modules that perform basic operations as a pico eNodeB, such as radio resource management in the pico cell and RRC signaling to the UE terminal, are appropriately omitted.

The radio communication device 1900 is provided with a RF communication processing part 1901 that performs analog processing of radio signals that are transmitted and received by an antenna and a digital communication processing part 1902 that performs modulation processing of digital transmission signals and demodulation processing of digital reception signals. The digital communication processing part 1902 exchanges transmission and reception data with an upper layer protocol of a communication layer of the device 1900. In addition, the digital communication processing part 1902 communicates with other eNodeBs through an X2 interface, a serving gateway (S-GW), and a mobility management entity (MME). When the radio communication device 1900 is a RRH, the baseband signal processing and control are performed under control of the macro eNodeB through the X2 interface.

A transmission frequency control part 1903 controls a frequency of transmitting a CSI-RS from the device 1900. The transmission frequency control part 1903 contributes to the realization of the above described means 2-1, 2-2, 3-3, 4-1, 4-2, 4-3, and 4 by determining a CSI-RS transmission frequency in accordance with a notification from a macro eNodeB (serving macro eNodeB) to which the device 1900 is subordinate.

A measurement frequency notification part 1904 contributes to the realization of the above-described means 1 and 3-3 by issuing an instruction related to the CSI-RS measurement frequency to the UE terminal belonging to the device 1900 in response to the CSI-RS transmission frequency determined by the transmission frequency control part 1903.

A setting information acquisition part 1905 acquires, through the X2 interface, various information set by the serving eNodeB with respect to the device 1900, such as a frequency of transmitting a CSI-RS from the device 1900.

Figure 20:
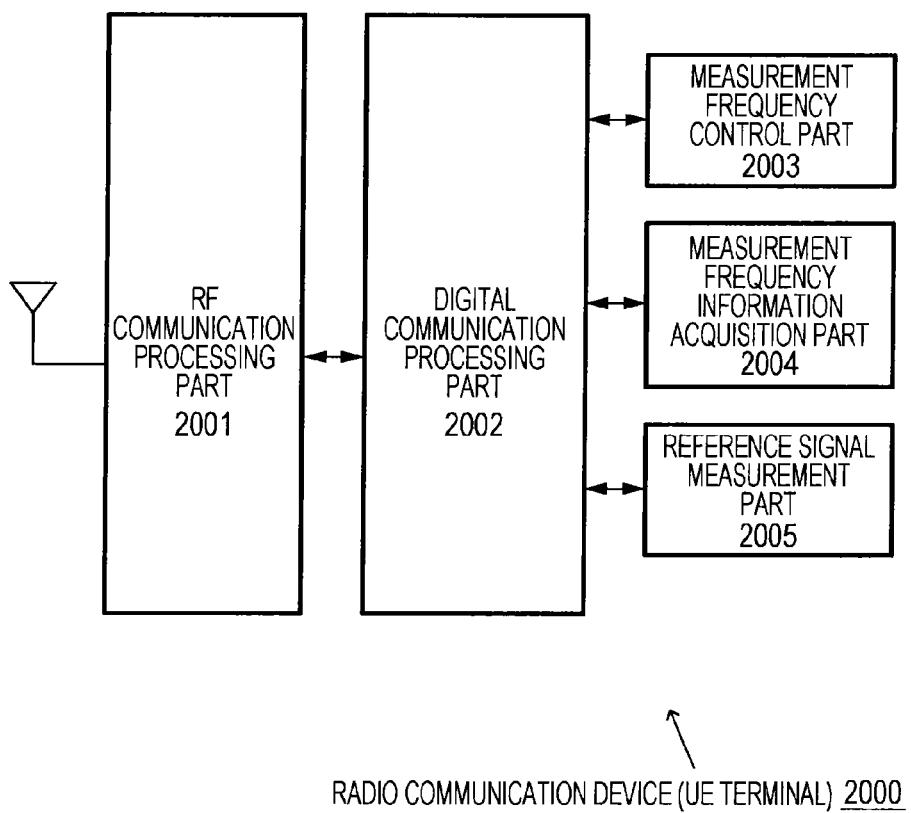
FIG. 20 is a diagram schematically showing an example of a configuration of a radio communication device 2000 that is operated as a UE terminal.

FIG. 20 schematically shows an example of a configuration of a radio communication device 2000 that is operated as a UE terminal in the radio communication system (FIG. 1) according to this exemplary embodiment. In FIG. 20, functional modules that perform basic operations as a UE terminal are appropriately omitted.

The radio communication device 2000 is provided with a RF communication processing part 2001 that performs analog processing of radio signals that are transmitted and received by an antenna and a digital communication processing part 2002 that performs modulation processing of digital transmission signals and demodulation processing of digital reception signals. The digital communication processing part 2002 exchanges transmission and reception data with an upper layer protocol of a communication layer of the device 2000.

A measurement frequency control part 2003 controls a frequency of measuring a reference signal for point selection such as a CSI-RS in the device 2000. For example, the measurement frequency control part 2003 controls a frequency of measuring a CSI-RS in response to a moving speed of the device 2000, to realize the above-described means 3-1. In addition, the measurement frequency control part 2003 controls a frequency of measuring a CSI-RS from each eNode in a CoMP set based on communication quality, to realize the above-described means 3-2. In addition, the measurement frequency control part 2003 performs control so that a CRS is measured in the scenario 3 and a CSI-RS is measured in the scenario 4 for point selection, to realize the above-described means 1.

A measurement frequency information acquisition part 2004 acquires information related to the setting of the CSI-RS measurement frequency from an eNodeB (serving pico eNodeB) to which the device 2000 belongs. In addition, the measurement frequency information acquisition part 2004 acquires, as information related to the measurement frequency, information for identifying a scenario that is applied in the cell. The CSI-RS measurement is performed in accordance with the measurement frequency acquired by the measurement frequency information acquisition part 2004 to contribute to the realization of the above-described means 1 and 3-3.

A reference signal measurement part 2005 performs measurement of a reference signal for point selection such as a CSI-RS, based on the measurement frequency determined by the measurement frequency control part 2003 or the measurement frequency acquired by the measurement frequency information acquisition part 2004. In addition, the reference signal measurement part 2005 realizes the above-described means 1 by reference signal switching in which measurement for point selection is performed using a CRS in the scenario 3 and is performed using a CSI-RS in the scenario 4. The results of the measurement by the reference signal measurement part 2005 are transmitted to the serving pico eNodeB through the digital communication processing part 2002 and the RF communication processing part 2001.

As described above, according to this exemplary embodiment, it is possible to improve a point selection update frequency while suppressing overhead of reference signals for point selection. As a result, it is possible to effectively obtain an improvement in throughput of the cell, that is, the communication system.

The technology disclosed in the present specification may employ the following configurations.

(1) A radio communication device including a measurement control part that sets a reference signal kind to be measured to determine a cooperation group that performs multi-point cooperative transmission and reception for the device, and a reference signal measurement part that measures a reference signal, that is transmitted from each base station, of the kind set by the measurement control part to determine the cooperation group.

(2) The radio communication device according to (1), in which the measurement control part sets a reference signal kind to be measured to determine the cooperation group in accordance with a scenario that is applied in a current cell.

(3) The radio communication device according to (2), in which each base station transmits a first reference signal that can be allocated to a place differing between base stations having the same cell identifier and that has an adjustable transmission cycle, and a second reference signal that uses the same place in base stations having the same cell identifier, and the measurement control part sets the first reference signal for use in measurement for determining the cooperation group in a first scenario in which the same cell identifier is allocated to each base station subordinate to the same large base station, and sets the second reference signal for use in measurement for determining the cooperation group in a second scenario in which a unique cell identifier is allocated for each base station even subordinate to the same large base station.

(4) The radio communication device according to (1), in which the measurement control part sets a reference signal kind to be measured to determine the cooperation group based on a notification from the base station.

(5) The radio communication device according to (4), in which each base station transmits a first reference signal that can be allocated to a place differing between base stations having the same cell identifier and that has an adjustable transmission cycle, and a second reference signal that uses the same place in base stations having the same cell identifier, and the measurement control part sets the first reference signal for use in measurement for determining the cooperation group with regard to a base station having a specific cell identifier notified by the base station, and sets the second reference signal for use in measurement for determining the cooperation group with regard to a base station having another cell identifier.

(6) A radio communication device including a reference signal transmission part that transmits a first reference signal that can be allocated to a place differing between base stations having the same cell identifier and that has an adjustable transmission cycle, and a second reference signal that uses the same place in base stations having the same cell identifier, and a notification part that notifies a terminal belonging to the device of a cell identifier for which measurement for determining a cooperation group is to be performed using the first reference signal in accordance with a scenario that is applied in a current cell.

(7) The radio communication device according to (6), in which in a scenario in which the same cell identifier is allocated to each base station subordinate to the same large base station, the notification part notifies a terminal belonging to the device of a cell identifier for which measurement for determining a cooperation group is to be performed using the first reference signal.

(8) A radio communication device including a subordinate base station information acquisition part that acquires information on base stations subordinate to the device, a transmission frequency control part that controls a frequency of transmitting a reference signal for determining a cooperation group that performs multi-point cooperative transmission and reception based on the information on base stations acquired by the subordinate base station information acquisition part, and a notification part that notifies each base station of the control information obtained by the transmission frequency control part.

(9) The radio communication device according to (8), in which the subordinate base station information acquisition part acquires information related to the number of terminals requiring the multi-point cooperative transmission and reception from the base stations subordinate to the device, and the transmission frequency control part controls the frequency of transmitting a reference signal in accordance with the number of terminals requiring the multi-point cooperative transmission and reception.

(10) The radio communication device according to (9), in which the transmission frequency control part lengthens a cycle of transmitting a reference signal when the number of terminals requiring the multi-point cooperative transmission and reception is small.

(11) A radio communication device including a reference signal transmission part that transmits a first reference signal, a feedback information acquisition part that acquires feedback on results of measurement of the first reference signal from a terminal, a measurement part that measures a reference signal to measure a second reference signal transmitted from the terminal, and a point selection part that determines a cooperation group that performs multi-point cooperative transmission and reception for a terminal station based on results of the measurement of the measurement part.

(12) The radio communication device according to (11), in which when TDD is applied, the point selection part determines a cooperation group that performs multi-point cooperative transmission and reception for a terminal station based on the feedback information acquired by the feedback information acquisition part and results of the measurement of the measurement part.

(13) A radio communication device including a reference signal measurement part that measures a reference signal transmitted from each base station to determine a cooperation group that performs multi-point cooperative transmission and reception for the device, and a measurement frequency control part that controls a frequency of performing measurement in the reference signal measurement part based on a moving speed of the device.

(14) The radio communication device according to (13), in which the measurement frequency control part allows measurement in the reference signal measurement part to be performed only when the moving speed of the device is high.

(15) A radio communication device including a reference signal measurement part that measures a reference signal transmitted from each base station to determine a cooperation group that performs multi-point cooperative transmission and reception for the device, and a measurement frequency control part that controls a frequency of the measurement for each base station in the reference signal measurement part based on results of the measurement in the reference signal measurement part.

(16) The radio communication device according to (15), in which based on the results of the measurement in the reference signal measurement part, the measurement frequency control part increases the measurement frequency for a base station in which a deterioration in communication quality is detected.

(17) The radio communication device according to (15), in which the measurement frequency control part increases the measurement frequency for a new base station that is not included in the cooperation group when a base station exhibiting a deterioration in communication quality is detected in the cooperation group.

(18) The radio communication device according to (8), in which the subordinate base station information acquisition part acquires arrangement information of the base stations subordinate to the device, and the transmission frequency control part controls the frequency of transmitting a reference signal in accordance with density of the base stations subordinate to the device.

(19) The radio communication device according to (18), in which the transmission frequency control part increases the frequency of transmitting a reference signal in an area in which the density of the base stations subordinate to the device is high.

(20) A radio communication device including a base station information acquisition part that acquires arrangement information of base stations that can be included in a cooperation group that performs multi-point cooperative transmission and reception for the device, a measurement frequency control part that controls a frequency of measuring a reference signal from a base station based on the acquired base station arrangement information, to determine the cooperation group, and a reference signal measurement part that measures a reference signal from a base station in accordance with the frequency controlled by the measurement frequency control part.

(21) The radio communication device according to (20), in which the measurement frequency control part increases the frequency of measuring a reference signal in an area in which density of the base stations that can be included in the cooperation group is high.

(22) A radio communication device including a carrier determination part that determines the importance of performing multi-point cooperative transmission and reception for each component carrier upon carrier aggregation, a transmission frequency control part that controls a frequency of transmitting a reference signal for determining a cooperation group that performs multi-point cooperative transmission and reception in each component carrier based on results of the determination in the carrier determination part, and a notification part that notifies each base station of the control information obtained by the transmission frequency control part.

(23) The radio communication device according to (22), in which the transmission frequency control part increases the frequency of transmitting a reference signal in a component carrier of high importance of performing the multi-point cooperative transmission and reception.

(24) A radio communication device including a transmission frequency control part that controls a frequency of transmitting a reference signal for determining a cooperation group that performs multi-point cooperative transmission and reception in each component carrier in accordance with frequency upon carrier aggregation, and a notification part that notifies each base station of the control information obtained by the transmission frequency control part.

(25) The radio communication device according to (24), in which the transmission frequency control part increases the frequency of transmitting a reference signal in a component carrier of high frequency.

(26) A radio communication device including a transmission frequency control part that controls a frequency of transmitting a reference signal for determining a cooperation group that performs multi-point cooperative transmission and reception in each component carrier in accordance with arrangement in terms of frequency upon carrier aggregation, and a notification part that notifies each base station of the control information obtained by the transmission frequency control part.

(27) The radio communication device according to (26), in which the transmission frequency control part allows a reference signal to be transmitted to only one of component carriers consecutively arranged in terms of frequency.

(28) The radio communication device according to (26), in which the transmission frequency control part allows a reference signal to be transmitted so that there is no overlap in terms of time and frequency in respective component carriers consecutively arranged in terms of frequency.

(29) The radio communication device according to (8), in which the subordinate base station information acquisition part acquires information related to the number of terminals that are in a radio link control-connected state with the respective base stations subordinate to the device, and the transmission frequency control part controls the frequency of transmitting a reference signal by the respective base stations subordinate to the device in accordance with the number of terminals that are in a radio link control-connected state.

(30) The radio communication device according to (29), in which the transmission frequency control part increases the frequency of transmitting a reference signal from a base station having a large number of terminals that are in a radio link control-connected state.

(31) A radio communication method including a measurement control step of setting a reference signal kind to be measured to determine a cooperation group that performs multi-point cooperative transmission and reception for the device, and a reference signal measurement step of measuring a reference signal, that is transmitted from each base station, of the kind set in the measurement control step to determine the cooperation group.

(32) A radio communication method including a reference signal transmission step of transmitting a first reference signal that can be allocated to a place differing between base stations having the same cell identifier and that has an adjustable transmission cycle, and a second reference signal that uses the same place in base stations having the same cell identifier, and a notification step of notifying a terminal belonging to the device of a cell identifier for which measurement for determining a cooperation group is to be performed using the first reference signal in accordance with a scenario that is applied in a current cell.

(33) A radio communication method including a subordinate base station information acquisition step of acquiring information on base stations subordinate to the device, a transmission frequency control step of controlling a frequency of transmitting a reference signal for determining a cooperation group that performs multi-point cooperative transmission and reception based on the information on base stations acquired in the subordinate base station information acquisition step, and a notification step of notifying each base station of the control information obtained by the transmission frequency control step.

(34) A radio communication method including a feedback information acquisition step of acquiring feedback on results of measurement of a first reference signal from a terminal, a measurement step of measuring a reference signal to measure a second reference signal transmitted from the terminal, and a point selection step of determining a cooperation group that performs multi-point cooperative transmission and reception for a terminal station based on the feedback information acquired in the feedback information acquisition step and results of the measurement in the measurement step.

(35) A radio communication method including a measurement frequency control step of controlling a frequency of measuring a reference signal transmitted from each base station based on a moving speed of the device, and a reference signal measurement step of measuring a reference signal to determine a cooperation group that performs multi-point cooperative transmission and reception for the device in accordance with the frequency controlled in the measurement frequency control step.

(36) A radio communication method including a reference signal measurement step of measuring a reference signal transmitted from each base station to determine a cooperation group that performs multi-point cooperative transmission and reception for the device, and a measurement frequency control step of controlling a frequency of the measurement for each base station in the reference signal measurement part based on results of the measurement in the reference signal measurement step.

(37) A radio communication method including a base station information acquisition step of acquiring arrangement information of base stations that can be included in a cooperation group that performs multi-point cooperative transmission and reception for the device, a measurement frequency control step of controlling a frequency of measuring a reference signal from a base station based on the acquired base station arrangement information, to determine the cooperation group, and a reference signal measurement step of measuring a reference signal from a base station in accordance with the frequency controlled in the measurement frequency control step.

(38) A radio communication method including a carrier determination step of determining the importance of performing multi-point cooperative transmission and reception for each component carrier upon carrier aggregation, a transmission frequency control step of controlling a frequency of transmitting a reference signal for determining a cooperation group that performs multi-point cooperative transmission and reception in each component carrier based on results of the determination in the carrier determination step, and a notification step of notifying each base station of the control information obtained by the transmission frequency control step.

(39) A radio communication method including a transmission frequency control step of controlling a frequency of transmitting a reference signal for determining a cooperation group that performs multi-point cooperative transmission and reception in each component carrier in accordance with frequency upon carrier aggregation, and a notification step of notifying each base station of the control information obtained by the transmission frequency control step.

(40) A radio communication method including a transmission frequency control step of controlling a frequency of transmitting a reference signal for determining a cooperation group that performs multi-point cooperative transmission and reception in each component carrier in accordance with arrangement in terms of frequency upon carrier aggregation, and a notification step of notifying each base station of the control information obtained by the transmission frequency control step.

(41) A radio communication system including a plurality of base stations that transmit a plurality of kinds of reference signals, respectively, and a terminal station that performs reference signal measurement by setting a reference signal kind to be measured to determine a cooperation group that performs multi-point cooperative transmission and reception for the terminal station.

(42) A radio communication system including a plurality of base stations that transmit a first reference signal that can be allocated to a place differing between base stations having the same cell identifier and that has an adjustable transmission cycle, and a second reference signal that uses the same place in base stations having the same cell identifier, and a terminal station that performs measurement for determining a cooperation group that performs multi-point cooperative transmission and reception for the terminal station by receiving a reference signal, in which at least one of the plurality of base stations notifies a terminal station belonging thereto of a cell identifier for which the measurement for determining the cooperation group is to be performed using the first reference signal.

(43) A radio communication system including a plurality of base stations that transmit a reference signal, and a terminal station that performs measurement for determining a cooperation group that performs multi-point cooperative transmission and reception for the terminal station by receiving the reference signal from the base station, in which at least one of the plurality of base stations controls a frequency of transmitting a reference signal from each base station based on information acquired from a base station subordinate to the terminal station.

(44) A radio communication system including a plurality of base stations that transmit a first reference signal, and a terminal station that performs measurement for determining a cooperation group that performs multi-point cooperative transmission and reception for the terminal station by receiving the first reference signal to give feedback to the base station and to transmit a second reference signal, in which at least one of the plurality of base stations determines the cooperation group that performs multi-point cooperative transmission and reception for the terminal station based on the feedback information from the terminal station and results of measurement of the second reference signal therein.

(45) A radio communication system including a plurality of base stations that transmit a reference signal, and a terminal station that performs measurement for determining a cooperation group that performs multi-point cooperative transmission and reception for the terminal station by receiving the reference signal with a frequency according to a moving speed of the terminal station.

(46) A radio communication system including a plurality of base stations that transmit a reference signal, and a terminal station that performs measurement for determining a cooperation group that performs multi-point cooperative transmission and reception for the terminal station by receiving the reference signal from the base station, in which the terminal station controls a measurement frequency for each base station based on results of the measurement of the reference signal from each base station.

(47) A radio communication system including a plurality of base stations that transmit a reference signal, and a terminal station that performs measurement for determining a cooperation group that performs multi-point cooperative transmission and reception for the terminal station by receiving the reference signal from the base station, in which the terminal station controls a frequency of measuring the reference signal from the base station based on arrangement information of the base stations which can be included in the cooperation group.

(48) A radio communication system including a plurality of base stations that transmit a reference signal, and a terminal station that performs measurement for determining a cooperation group that performs multi-point cooperative transmission and reception for the terminal station by receiving the reference signal from the base station, in which at least one of the plurality of base stations controls a frequency of transmitting a reference signal for each component carrier based on the importance of performing multi-point cooperative transmission and reception in each component carrier upon carrier aggregation.

(49) A radio communication system including a plurality of base stations that transmit a reference signal, and a terminal station that performs measurement for determining a cooperation group that performs multi-point cooperative transmission and reception for the terminal station by receiving the reference signal from the base station, in which at least one of the plurality of base stations controls a frequency of transmitting a reference signal for each component carrier in accordance with frequency of each component carrier upon carrier aggregation.

(50) A radio communication system including a plurality of base stations that transmit a reference signal, and a terminal station that performs measurement for determining a cooperation group that performs multi-point cooperative transmission and reception for the terminal station by receiving the reference signal from the base station, in which at least one of the plurality of base stations controls a frequency of transmitting a reference signal in each of component carriers consecutively arranged in terms of frequency in accordance with the arrangement of the component carriers in terms of frequency upon carrier aggregation.

INDUSTRIAL APPLICABILITY

As described above, the technology disclosed in the present specification has been described in detail with reference to the specific exemplary embodiments. However, it is obvious for those skilled in the art that the exemplary embodiments can be modified or substituted without departing from the gist of the technology disclosed in the present specification.

In the present specification, the description has focused on the exemplary embodiments applied to a cellular communication system according to LTE designed by 3GPP, but the gist of the technology disclosed in the present specification is not limited thereto. The technology disclosed in the present specification can similarly be applied to various cellular communication systems to which a technology for simultaneously transmitting and receiving data to a terminal by cooperation of plural base stations is applied.

In summary, the technology disclosed in the present specification has been described in the form of exemplification and the content described in the present specification should not be interpreted restrictively. In order to judge the gist of the technology disclosed in the present specification, the claim should be taken into consideration.

REFERENCE SIGNS LIST

1800 RADIO COMMUNICATION DEVICE (macro eNodeB)
1801 RF COMMUNICATION PROCESSING PART
1802 DIGITAL COMMUNICATION PROCESSING PART
1803 RRH INFORMATION ACQUISITION PART
1804 TRANSMISSION FREQUENCY CONTROL PART
1805 CARRIER DETERMINATION PART
1806 NOTIFICATION PART
1807 POINT SELECTION PART
1900 RADIO COMMUNICATION DEVICE (pico eNodeB or RRH)
1901 RF COMMUNICATION PROCESSING PART
1902 DIGITAL COMMUNICATION PROCESSING PART
1903 TRANSMISSION FREQUENCY CONTROL PART
1904 MEASUREMENT FREQUENCY NOTIFICATION PART
1905 SETTING INFORMATION ACQUISITION PART
2000 RADIO COMMUNICATION DEVICE (UE terminal)
2001 RF COMMUNICATION PROCESSING PART
2002 DIGITAL COMMUNICATION PROCESSING PART
2003 MEASUREMENT FREQUENCY CONTROL PART
2004 MEASUREMENT FREQUENCY INFORMATION ACQUISITION PART
2005 REFERENCE SIGNAL MEASUREMENT PART

The invention claimed is:

1. A radio communication device comprising:
a subordinate base station information acquisition part configured to acquire information related to a number of terminals requiring a multi-point cooperative transmission and reception from base stations subordinate to the radio communication device;
a transmission frequency control part configured to control a frequency of transmitting a reference signal by the base stations, for determining a cooperation group configured to perform the multi-point cooperative transmission and reception, based on the number of terminals requiring the multipoint cooperative transmission and reception; and
a notification part configured to notify each base station of control information obtained by the transmission frequency control part.

2. The radio communication device according to claim 1, wherein the transmission frequency control part is configured to lengthen a cycle of transmitting the reference signal in an event of the number of terminals requiring the multi-point cooperative transmission and reception is small.

3. The radio communication device according to claim 1, wherein the subordinate base station information acquisition part is configured to acquire arrangement information of the base stations subordinate to the radio communication device, and
wherein the transmission frequency control part is configured to control the frequency of transmitting the reference signal in accordance with density of the base stations subordinate to the radio communication device.

4. The radio communication device according to claim 3, wherein the transmission frequency control part is configured to increase the frequency of transmitting the reference signal in an area in which the density of the base stations subordinate to the radio communication device is high.

5. A radio communication device comprising:
a reference signal measurement part configured to measure a reference signal transmitted from each base station to determine a cooperation group that performs multi-point cooperative transmission and reception for the radio communication device; and
a measurement frequency control part configured to control a frequency of the measurement for each base station in the reference signal measurement part based on results of the measurement in the reference signal measurement part,
wherein the frequency of measurement for a new base station that is not included in the cooperation group is increased in an event of a base station exhibiting a deterioration in communication quality is detected in the cooperation group.

6. The radio communication device according to claim 5, wherein based on the results of the measurement in the reference signal measurement part, the measurement frequency control part is configured to increase the measurement frequency for a base station in which a deterioration in communication quality is detected.

7. A radio communication device comprising:
a base station information acquisition part configured to acquire arrangement information of base stations that can be included in a cooperation group configured to perform multipoint cooperative transmission and reception for the radio communication device;
a measurement frequency control part configured to control a frequency of measuring a reference signal from a base station based on the acquired base station arrangement information, to determine the cooperation group, wherein the frequency of measuring the reference signal is increased in an area in which density of the base stations that can be included in the cooperation group is high; and
a reference signal measurement part configured to measure the reference signal from the base station in accordance with the frequency controlled by the measurement frequency control part.

8. A radio communication device comprising:
a carrier determination part configured to determine the importance of performing multi-point cooperative transmission and reception for each component carrier upon carrier aggregation;
a transmission frequency control part configured to control a frequency of transmitting a reference signal for determining a cooperation group configured to perform multi-point cooperative transmission and reception in each component carrier based on results of the determination in the carrier determination part; and a notification part configured to notify each base station of control information obtained by the transmission frequency control part.

9. The radio communication device according to claim 8, wherein the transmission frequency control part is configured to increase the frequency of transmitting the reference signal in a component carrier of high importance of performing the multi-point cooperative transmission and reception.

10. A radio communication device comprising:

a transmission frequency control part configured to control a frequency of transmitting a reference signal for determining a cooperation group configured to perform multi-point cooperative transmission and reception in each component carrier in accordance with frequency upon carrier aggregation; and a notification part that is configured to notify each base station of control information obtained by the transmission frequency control part.

11. The radio communication device according to claim 10, wherein the transmission frequency control part is configured to increase the frequency of transmitting the reference signal in a component carrier of high frequency.

12. A radio communication device comprising:

a transmission frequency control part configured to control a frequency of transmitting a reference signal by base stations, for determining a cooperation group configured to perform multi-point cooperative transmission and reception in each component carrier, in accordance with arrangement in terms of frequency upon carrier aggregation; and a notification part that configured to notify each base station of control information obtained by the transmission frequency control part.

13. The radio communication device according to claim 12, wherein the transmission frequency control part is configured to allow the reference signal to be transmitted to only one of component carriers consecutively arranged in terms of frequency.

14. The radio communication device according to claim 12, wherein the transmission frequency control part is configured to allow the reference signal to be transmitted so that there is no overlap in terms of time and frequency in respective component carriers consecutively arranged in terms of frequency.

15. The radio communication device according to claim 1, wherein the subordinate base station information acquisition part is configured to acquire information related to a number of terminals that are in a radio link control-connected state with the respective base stations subordinate to the radio communication device, and wherein the transmission frequency control part is configured to control the frequency of transmitting the reference signal by the respective base stations subordinate to the radio communication device in accordance with the number of terminals that are in the radio link control-connected state.

16. The radio communication device according to claim 15, wherein the transmission frequency control part is configured to increase the frequency of transmitting the reference signal from a base station having a large number of terminals that are in the radio link control-connected state.

* * * * *